United States Patent
Legbedji et al.

(10) Patent No.: US 8,977,524 B2
(45) Date of Patent: Mar. 10, 2015

(54) INTERIOR POINT METHOD FOR REFORMULATED OPTIMAL POWER FLOW MODEL

(75) Inventors: Motto Alexis Legbedji, Princeton, NJ (US); Ruken Duzgun, Bethlehem, PA (US); Ioannis Akrotirianakis, Plainsboro, NJ (US); Amit Chakraborty, East Windsor, NJ (US)

(73) Assignee: Siemens Aktiengesellschaft, Munich (DE)

( * ) Notice: Subject to any disclaimer, the term of this patent is extended or adjusted under 35 U.S.C. 154(b) by 536 days.

(21) Appl. No.: 13/413,086

(22) Filed: Mar. 6, 2012

(65) Prior Publication Data

US 2013/0238148 A1 Sep. 12, 2013

(51) Int. Cl.
- G06F 7/60 (2006.01)
- H02J 3/14 (2006.01)
- G06Q 10/04 (2012.01)
- H02J 3/00 (2006.01)

(52) U.S. Cl.
CPC .............. *H02J 3/14* (2013.01); *H02J 2003/007* (2013.01); *H02J 2003/146* (2013.01); *G06Q 10/04* (2013.01); *Y02B 70/3225* (2013.01); *Y04S 20/222* (2013.01); *Y04S 20/224* (2013.01)
USPC ............................................................ 703/2

(58) Field of Classification Search
None
See application file for complete search history.

(56) References Cited

U.S. PATENT DOCUMENTS

| | | | |
|---|---|---|---|
| 6,625,520 B1 * | 9/2003 | Chen et al. | 700/286 |
| 6,775,597 B1 * | 8/2004 | Ristanovic et al. | 700/293 |
| 8,126,685 B2 * | 2/2012 | Nasle | 703/4 |
| 8,775,136 B2 * | 7/2014 | Akrotirianakis et al. | 703/2 |

OTHER PUBLICATIONS

"Optimal Real-time Pricing Algorithm Based on Utility Maximization for Smart Grid", Samadi et al. © 2010 IEEE.*
"An Optimal Power Flow with User-Defined Objective Functions and Constraints", Machado et al. 15th PSCC, Liege, Aug. 22-26, 2005.*

* cited by examiner

*Primary Examiner* — Omar Fernandez Rivas
*Assistant Examiner* — Nithya J Moll

(57) ABSTRACT

A method for approximating an optimal power flow of a smart electric power grid includes providing a cost function that models a smart electric power grid having buses connected by branches, deriving a set of linear equations that minimize the cost function subject to constraints from an expression of an extremum of the cost function with respect to all arguments, reducing a dimension of the linear equations by solving for a subset of the linear equations, re-organizing the reduced dimension linear equations into primal and dual parts, and decomposing the re-organized reduced dimensional linear equations into two systems of block matrix equations which can be solved by a series of back substitutions. A solution of the two systems of block matrix equations yields conditions for a lowest cost per kilowatthour delivered through the smart electric power grid.

21 Claims, 4 Drawing Sheets

INTERIOR POINT METHOD FOR REFORMULATED OPTIMAL POWER FLOW MODEL

TECHNICAL FIELD

This disclosure is directed to methods of analyzing and modeling electric power grids, in particular smart grids.

DISCUSSION OF THE RELATED ART

An Optimal Power Flow (OPF) model of an electric power network is a model whose solution provides the conditions which give the lowest cost per kilowatthour delivered. Electricity flowing through an AC network is subject to Kirchhoff's Laws, and transmission lines are subject to thermal limits as well as voltage and electrical stability constraints. An OPF model should be capable to quickly and efficiently analyze an electric power network and yield a feasible power flow solution under a wide variety of adverse conditions and determine the most efficient set of actions to take.

OPF models present challenges even for cutting-edge mathematical programming techniques due to a sheer size of contingency cases that fully couple all network components for all adverse scenarios. Decoupling presents issues as it is well known that contingency analysis of power networks lacks even the most basic intuitive properties such as monotonicity, in that if tripping a branch results in an infeasible network, then tripping this branch and an extra branch should also be infeasible, but often is not.

A basecase OPF model seeks to produce an optimal power flow solution balancing generation/consumption for all buses with power distribution across all connected branches such that the overall system state, as measured by underlying physics parameters including voltages and phase angles, is feasible and safe.

A basecase OPF model can control AC and DC energy dispatches, regulate AC bus voltages and phase angles, select AC transformer/phasor tap and shunt switches, and control the AC/DC converter.

In a basecase OPF model, an electric power network is made up of the following components and their controls/states:

AC Bus: represented by a node in the network graph. An AC bus has the following controls & states:
Load: Utilizes active (MW) and/or reactive (MVar) power;
Generator: Provides active (MW) and reactive (MVar) power;
Voltage and Phase angle: restricted to certain range around nominal;
Shunt capacitor/inductor: are optional, can be fixed or switching, can be positive (capacitor) or negative (inductor) and moderates active and reactive net power produced at the bus;
The main AC bus parameters are: bounds for Load and Generation, and bounds for Voltage and Phase Angle.
AC Branch/Line: represented by an arc in the network graph and transmits both active and reactive power. An AC branch has the following controls and states:
Power flow: active and reactive power injected into the branch by both of its connected buses;
Adjusted impedance: is optional and represents branch impedance adjusted by an attached transformer;
The main AC branch parameters are: Admittance matrix, calculated based on the branch Impedance and the branch fixed shunt admittances, and Flow Capacity Ratings, which are the minimum and maximum total flow as constrained by thermal ratings.
AC Transformer: is an extra add-on to the AC branch that may either transform its connected buses' voltages, (referred to herein as Transformer mode) or shift the difference between its connected buses' phase angles (referred to herein below as Phasor mode). The AC Transformer has the following controls and states:
Tap choice;
The main AC Transformer parameters are Tap Turns Ratio for Transformer mode, and Tap Phase Shift for Phasor mode.
DC Bus: represented by a node in the network graph. A DC bus has the following controls & states:
DC Voltage and Current Injection;
The main DC bus parameters are: bounds for Voltage and Current.
DC Branch/Line: represented by an arc in the network graph and transmits a constant current. A DC branch has the following controls and states:
DC Current;
The main DC bus parameter is: Resistance.
Converter: represented by an arc in the network graph that connects AC and DC buses. Converters can be of two types: Rectifier, for AC to DC, and Inverter for DC to AC. A converter has the following controls and states:
Firing and Overlap angles, AC side voltage, since the converter comes with a Transformer;
Power Factor, Active Power injection;
The main Converter parameters are: bounds for all converter controls and states and Commutating Impedance.

Other model components include a Voltage Source Converter (VSC), which is a special type of the converter that does not involve firing/overlap angles and directly controls voltage, power factor and active power injection, and FACTS devices, which are not modeled as distinct components but rather define tight bounds on certain controls/states of network components that are regulated by FACTS. Buses may be grouped in areas for defining area power exchange and inter-area power transfer constraints. Area involves several Interfaces that are corresponding groupings of branches that connect one area to another.

FIG. 1 is labelled to show each of the elements that may exist in an electric power system network. Their symbolic representation may also be seen.

An OPF mathematical formulation according to an embodiment of the invention is focused on making a basecase model formulation suitable for optimization solvers, in particular, utilizing as few as possible non-linear equations and as few as possible integer variables, and is extendable to contingency cases.

A power network is modeled as a standard graph $N=\{V(N), E(N)\}$ where $V(N)$ is the set of buses and $E(N)$ is the set of branches. Within $V(N)$, one can distinguish the following subsets: the AC bus set $V(AC)$ and the DC bus set $V(DC)$. Within $E(N)$ one can distinguish the set of AC branches $E(AC)$, the set of DC branches $E(DC)$, and the set of converters $V(C)$. Also, one cane distinguish inter-area interface branch groupings $E(I)$.

Every control and state variable mentioned in the previous section has a box constraint that are represented by lower and upper bound constraints, not all of which are explicitly mentioned below. An example of box constraint is the active power generation control variable $P_{ig}$, which is subject to generation bound box constraints:

$$P_{ig\ min} \leq P_{ig} \leq P_{ig\ max}.$$

Note that all choice variables in an OPF model according to an embodiment of the invention, which reflect the choice of each transformer/phasor tap or each shunt switch, denoted $w_k$, not only are subject to be within the [0; 1] box but also should satisfy the Exclusive Choice constraint:

$$\sum_{k=1}^{K} w_k = 1$$

The set of AC bus constraints comprises the fundamental set of network constraints, called the Power Flow Conservation set (PFC):

$$P_{ig} - P_{il} + P_{i,shunt} = \sum_{e \in \delta^+(i)} P_e + \sum_{c \in \delta^+(i)} P_c$$

$$Q_{ig} - Q_{il} + Q_{i,shunt} = \sum_{e \in \delta^+(i)} Q_e + \sum_{c \in \delta^+(i)} Q_c.$$

The l.h.s. reflects the net power injection generation and the r.h.s. reflects the net power flow coming from both V(AC) and V(C). The shunt term in the PFC constraint is given by:

$$P_{i,shunt} = \sum_{k=1}^{K_i} w_{ik} \cdot P_{ik}$$

$$Q_{i,shunt} = \sum_{k=1}^{K_i} w_{ik} \cdot Q_{ik}$$

The set of AC branch constraints includes:

Voltage Law (VL): $\begin{array}{l} P_{ij} = V_{ii} G_{ii} + V_{ij}(G_{ij} * \cos(\theta_{ij}) + B_{ij} * \sin(\theta_{ij})) \\ Q_{ij} = -V_{ii} B_{ii} + V_{ij}(G_{ij} * \sin(\theta_{ij}) - B_{ij} * \cos(\theta_{ij})) \end{array}$ Note that the variables $V_{ij}$ are given by the Voltage Tensor product represented by bilinear constraints:

$$V_{ij} = \hat{V}_i \cdot \hat{V}_j$$

In addition, the variables $\theta_{ij}$ are given by the Angle Difference relation represented by:

$$\theta_{ij} = \theta_i - \theta_j - \sum_{k=1}^{K_p} w_{pk} \Delta_{pk}$$

where $$\sum_{k=1}^{K_p} w_{pk} \Delta_{pk}$$

is the phase shift due to a Phasor (if any).

Note also that for the sake of convenience for every physical undirected AC branch an OPF model according to an embodiment of the invention model has two logical directed AC branches: (i,j) and (j,i). These branches are not coupled but their parameters are calculated based on the same physical branch characteristics, such as impedance.

The set of Transformer constraints includes:
Joint mixed-integer-linear tap voltage box constraints:

$$w_{tk} \cdot \underline{V}_{tk} \leq \hat{V}_{tk} \leq w_{tk} \cdot \overline{V}_{tk}.$$

Link with Bus Voltage:

$$V_i = \sum_{k=1}^{K_t} \hat{V}_{tk} \cdot I_{tk}.$$

Link with Branch (Tapped) Voltage:

$$\hat{V}_i = \sum_{k=1}^{K_t} \hat{V}_{tk}.$$

Note that in a model according to an embodiment of the invention there are two logical transformers corresponding to one physical transformer: one for (I,j) line and the other for (j,i) line. These two logical transformers not only have their parameters generated by the same underlying set of taps of the physical transformer but they also are explicitly coupled through an artificial component referred to as Coupling. Coupling holds any pair of component IDs and couples all of their choice variables one-to-one with each other such as:

for $(t_1,t_2) \in$ coupling: $w_{t_1k} = w_{t_2k}$.

Similarly, Phasors are coupled.

Note that the tap choice variables $w_{tk}$ are restricted to be in [0; 1] box but in addition can be restricted to be binary by a Mixed-Integer integrability constraint: $w_{t_1k} \in \{0; 1\}$ These constraints implies using an MIP solver and is expensive computationally while providing more responsive transformer control.

Impedance Adjustment constraints produce a choice of the admittance matrix (G, B) that depends on transformer/phasor tap position. For each Impedance Adjustment record a choice variable is introduced that is one-to-one (i.e. do not require extra integrability constraints) linked to transformer/phasor tap choice through the following linear constraints:

$$w_{am} \geq w_{tk} \cdot I(\underline{t}_{am} \leq t_{tk} \leq \overline{t}_{am})$$

The chosen admittance matrix is then given by the sum:

$$(G, B) = \sum_{k=1}^{K_a} w_{ak} \cdot (G, B)_{ak}$$

The set of Area constraints involve aggregation of branch power flows into area interface flows:

$$P_f = \sum_{e \in I(f)} P_e$$

$$Q_f = \sum_{e \in I(f)} Q_e.$$

The set of DC bus constraints comprises the fundamental set of network constraints called the Current Flow Conservation set (CFC):

$$I_i = \sum_{e \in \delta^+(i)} I_e - \sum_{e \in \delta^-(i)} I_e$$

Note that $I_i$ reflects external current injection from AC/DC converters and thus if no converters are attached to the DC node I then the box constraint for $I_i$ is: $0 \leq I_i \leq 0$ The set of DC branch constraints comprises the DC version of the Voltage Law:

$$I_{ij} \cdot R_{ij} = V_j - V_i$$

Finally, the set of Converter constraints comprises:

AC/DC Voltage relation: $V_{DC} = \frac{1}{2} V_{AC} \cdot (\cos(\alpha) + \cos(\mu))$ $V_{DC} = V_{AC} \cdot \cos(\alpha + \mu) - I_{DC} \cdot R_{com}$ Power factor relation: $\cos(R) = \frac{1}{2}(\cos(\alpha) + \cos(\mu))$ $Q = P \cdot \tan(R)$ Active power injection from AC side: $P = V_{DC} \cdot I_{DC}$.

Note that the sign of active power injection is opposite for Rectifier and Inverter.

Finally, an OPF model can handle an objective function of arbitrary form. A basecase OPF objective function according to an embodiment of the invention is a generic convex quadratic cost of all buses' generation and load:

$$\min \sum_{i \in V(AC)} \left[ C_{ig}^a (\hat{P}_{ig})^2 + C_{il}^a (\hat{P}_{il})^2 + \right.$$

$$\left. C_{ig}^r (\hat{Q}_{ig})^2 + C_{il}^r (\hat{Q}_{il})^2 + B_{ig}^a \hat{P}_{ig} + B_{il}^a \hat{P}_{il} + B_{ig}^r \hat{Q}_{ig} + B_{il}^r \hat{Q}_{il} \right],$$

where each active/reactive load or generation term reflects a linear transformation, that is, a centering and scaling with respect to a given reference value, of the corresponding model variables. Alternatively, another more complex objective function is one that minimizes the active power losses, defined as:

$$\min \sum_{i=1}^{n} \sum_{j=1}^{n} G_{ij} \left( V_i^2 + \left(\frac{V_j}{ri_j}\right)^2 - 2 \frac{V_i V_j}{r_{ij}} \cos(\theta_i - \theta_j + \varphi_{ij}) \right)$$

where $V_i$, $V_j$ and $\theta_i$, $\theta_j$ represent the voltages and angles of the i-th and j-th buses, respectively, and $G_{ij}$ represents the conductances of the branch connecting buses i and j. The ratio of the branch (i,j) is denoted by $r_{ij}$, and the additional angle difference between buses i and j is denoted by $\phi_{ij}$. Note that $\phi_{ij} = 0$ in the case where there is no phase shifter transformer in the branch (i, j). According an embodiment of the invention, a quadratic approximation of a non-linear objection function will be used.

A basecase OPF model according to an embodiment of the invention as defined above is very complex for numerical optimization due to:

a) Non-convex Voltage Law constraints;
b) Fully coupled Power Flow Conservation network constraints;
c) Integer choice variables for transformer/phasor taps & switching shunts;
d) Large network size in realistic examples;

From the above presentation it is evident that solving OPF models is a very challenging task. Its solution demands the development of sophisticated optimization algorithms which can handle both the large number of decision variables and the complex (non-convex) type of constraints. However, embodiments of the invention provide algorithms that have been successfully applied to the solution of very large scale electrical networks and the smart grid.

SUMMARY

Exemplary embodiments of the invention as described herein generally include systems and methods for approximating an optimal power flow of a smart electric power grid.

According to an aspect of the invention, there is provided a method for approximating an optimal power flow of a smart electric power grid, including providing a cost function that models a smart electric power grid having buses $i \in [1,N]$ connected by branches $ij \in [1,N] \times [1,N]$ with connection matrix $$R_{ij} = \begin{cases} 1, & \exists (i,j), \\ 0, & o/w, \end{cases}$$

in terms of bus control vector $u_i$ that include voltage magnitudes $V_i$, phase angles $\theta_i$, and shunt switch positions $Q_{i\cdot}$, bus dependent variables vector $x_i$ that include net active $x_i^P$ and reactive $x_i^Q$ power injection, branch control vector $u_{ij}$ that includes transformer tap selections $t_{ij}$ and phase shifts $\phi_{ij}$, and dependent branch variable vector $x_{ij}$, that includes net active $x_{ij}^P$ and reactive $x_{ij}^Q$ power injections, constraining the bus and branch control vectors, and the bus and branch dependent variables vectors based on physical and operational requirements and actual measurements, deriving a set of linear equations that minimize the cost function subject to the constraints, from an expression of an extremum of the cost function with respect to all arguments, reducing a dimension of the linear equations by solving for a subset of the linear equations, re-organizing the reduced dimension linear equations into primal and dual parts, and decomposing the re-organized reduced dimensional linear equations into two systems of block matrix equations, where a solution of the two systems of block matrix equations yields conditions for a lowest cost per kilowatthour delivered through the smart electric power grid.

According to a further aspect of the invention, the cost function is $$f(x,u) = \sum_{i=1}^{N} \left[ \frac{1}{2} x_i^T V_i^X x_i + \frac{1}{2} u_i^T V_i^U u_i + S_i^X x_i + S_i^U u_i \right] +$$

$$\sum_{i,j=1}^{N} R_{ij} \cdot \left[ \frac{1}{2} x_{ij}^T W_{ij}^X x_{ij} + \frac{1}{2} u_{ij}^T W_{ij}^U u_{ij} + T_{ij}^X x_{ij} + T_{ij}^U u_{ij} \right],$$

where bus control vector $u_i$ includes voltage magnitudes $V_i$, phase angles $\theta_i$, and shunt switch positions $Q_{i\cdot}$, bus dependent variables vector $x_i$ includes net active $x_i^P$ and reactive $x_i^Q$ power injection, branch control vector $u_{ij}$ includes transformer tap selections $t_{ij}$ and phase shifts $\phi_{ij}$, and dependent branch variable vector $x_{ij}$ includes net active $x_{ij}^P$ and reactive $x_{ij}^Q$ power injections, and connection matrix $$R_{ij} = \begin{cases} 1, & \exists (i,j), \\ 0, & o/w, \end{cases} \text{ where } x_i = \sum_{j=1}^{N} R_{ij} \cdot x_{ij},$$

where $V^X$ is a Hessian of the objective function with respect to $x_i$, $V^U$ is a Hessian of the objective function with respect to $u_i$, $S^X$ is a gradient of the objective function with respect to $x_i$, $S^U$ is a gradient of the objective function with respect to $u_i$, $W^X$ is a Hessian of the objective function with respect to $x_{ij}$, $W^U$ is a Hessian of the objective function with respect to $u_{ij}$, $T^X$ is a gradient of the objective function with respect to $x_{ij}$, and $T^U$ is a gradient of the objective function with respect to $u_{ij}$, subject to the constraints $$x_i^{LB} \leq x_i \leq x_i^{UB}, \; x_{ij}^{LB} \leq x_{ij} \leq x_{ij}^{UB}, \text{ and}$$

$$u_i^{LB} \leq u_i \leq u_i^{UB}, \; u_{ij}^{LB} \leq u_{ij} \leq u_{ij}^{UB},$$

satisfying a voltage law $x_{ij} = R_{ij} \cdot (A_{ij}^0 u_i + B_{ij}^0 u_j + C_{ij}^0 u_{ij} + D_{ij}^0 u_{ji} + E_{ij}^0)$, where the matrices $A_{ij}^0$, $B_{ij}^0$, $C_{ij}^0$, $D_{ij}^0$, $E_{ij}^0$ can be explicitly pre-calculated for every link $(i, j)$ for a given anchor point $(u_i^0, u_j^0, u_{ij}^0)$.

According to a further aspect of the invention, the linear equations that minimize the cost function are:

$$\begin{bmatrix} H_{11} & 0 & -I & H_{41}^T & H_{51}^T & -I & 0 \\ 0 & 0 & -I & 0 & 0 & 0 & -I \\ -I & -I & 0 & 0 & 0 & 0 & 0 \\ H_{41} & 0 & 0 & 0 & 0 & 0 & 0 \\ H_{51} & 0 & 0 & 0 & 0 & 0 & 0 \\ \text{diag}(Zx) & 0 & 0 & 0 & 0 & \text{diag}(X) & 0 \\ 0 & \text{diag}(Zs) & 0 & 0 & 0 & 0 & \text{diag}(S) \end{bmatrix} \cdot \begin{bmatrix} \Delta X \\ \Delta S \\ \Delta Y \\ \Delta y_1 \\ \Delta y_2 \\ \Delta Z_x \\ \Delta Z_s \end{bmatrix} =$$

$$-\begin{bmatrix} \nabla f(X) - Z_x - Y - y_1^T \nabla o(x_{ij}, x_i) - y_2^T \nabla v(X) \\ -Y - Z_s \\ -(X + S - X^{UB}) \\ -o(x_{ij}, x_i) \\ -v(X) \\ Z_x \cdot X - \mu e \\ Z_e \cdot S - \mu e \end{bmatrix},$$

where $[\Delta X, \Delta S, \Delta Y, \Delta y_1, \Delta y_2, \Delta Z_x, \Delta Z_s]$ are unknowns, $$H_{11} = \text{diag}(V^x, W^x, V^u, W^U),$$

$$H_{41} = [-I, R, 0, 0],$$

$$R = \begin{pmatrix} [R_{11}I \ldots R_{1N_1}I] & 0 & \ldots & 0 \\ 0 & [R_{21}I \ldots R_{2N_2}I] & \ldots & 0 \\ 0 & \vdots & \ddots & \vdots \\ 0 & \ldots & 0 & [R_{N_1 1}I \ldots R_{N_1 N_1}I] \end{pmatrix},$$

a row of branch $(i, j)$ of $H_{51}$ is $$(H_{51})_{ij} = [0, -I, \ldots R_{ij}A_{ij}^0, \ldots R_{ij}B_{ij}^0, \ldots R_{ij}C_{ij}^0, \ldots R_{ij}D_{ij}^0, \ldots 0],$$

$$X = (\{x_{il}\}, \{x_{ijl}\}, \{u_{il}\}, \{u_{ijl}\})^T,$$

slack variables $S = (\{s_{xi}\}, \{s_{xij}\}, \{s_{ui}\}, \{s_{uij}\})^T,$ $$o(x_{ij}, x_i) = x_{i1} - \sum_{j=1}^{N} R_{ij} \cdot x_{ij1} - b_x,$$

$$v(X) = x_{ij1} - R_{ij} \cdot (A_{ij}^0 \cdot u_{i1} + B_{ij}^0 \cdot u_{j1} + C_{ij}^0 \cdot u_{ij1} + D_{ij}^0 \cdot u_{ji1}) - b_v,$$

$Y$, $y_1$, and $y_2$ are dual variables, and $Z_X = \mu/X$, $Z_S = \mu/S$ where $\mu$ is a barrier parameter.

According to a further aspect of the invention, reducing a dimension of the linear equations further comprises solving for $$\Delta Z_X = \text{diag}(X)^{-1}(-r_{Z_X} - \text{diag}(Z_X)\Delta X),$$

where $$\Delta Z_S = \text{diag}(S)^{-1}(-r_{Z_S} - \text{diag}(Z_S)\Delta S),$$

$$r_{Z_X} = Z_X \cdot X - \mu e, \; r_{Z_S} = Z_S \cdot S - \mu e.$$

According to a further aspect of the invention, the reduced dimension linear equations re-organized into primal and dual parts are $$\begin{bmatrix} H_{41} & 0 & | & 0 & 0 & 0 \\ H_{51} & 0 & | & 0 & 0 & 0 \\ -I & -I & | & 0 & 0 & 0 \\ - & - & - & - & - & - \\ H_{11} + \text{diag}(X)^{-1}\text{diag}(Z_x) & 0 & | & -I & H_{41}^T & H_{51}^T \\ 0 & \text{diag}(S)^{-1}\text{diag}(Z_s) & | & -I & 0 & 0 \end{bmatrix} \begin{bmatrix} \Delta X \\ \Delta S \\ - \\ \Delta Y \\ \Delta y_1 \\ \Delta y_2 \end{bmatrix} =$$

$$\begin{bmatrix} -r_{y_1} \\ -r_{y_2} \\ -r_Y \\ - \\ -r_X - \text{diag}(X)^{-1} r_Z \\ -r_S - \text{diag}(S)^{-1} r_Z \end{bmatrix},$$

where $$\begin{bmatrix} r_X \\ r_S \\ r_Y \\ r_{y_1} \\ r_{y_2} \end{bmatrix} = \begin{bmatrix} \nabla f(X) - Z_x - Y - y_1^T \nabla o(x_{ij}, x_i) - y_2^T \nabla v(X) \\ -Y - Z_s \\ -(X + S - X^{UB}) \\ -o(x_{ij}, x_i) \\ -v(X) \end{bmatrix}.$$

According to a further aspect of the invention, the two systems of block matrix equations are $$\begin{bmatrix} H_{41} & 0 \\ H_{51} & 0 \\ -I & -I \end{bmatrix} \begin{bmatrix} \Delta X \\ \Delta S \end{bmatrix} = \begin{bmatrix} -r_{y_1} \\ -r_{y_2} \\ -r_Y \end{bmatrix}, \text{ and}$$

$$\begin{bmatrix} \tilde{H}_{11} & 0 \\ 0 & \tilde{H}_{22} \end{bmatrix} \begin{bmatrix} \Delta X \\ \Delta S \end{bmatrix} + \begin{bmatrix} -I & H_{41}^T & H_{51}^T \\ -I & 0 & 0 \end{bmatrix} \begin{bmatrix} \Delta Y \\ \Delta y_1 \\ \Delta y_2 \end{bmatrix} = \begin{bmatrix} -\tilde{r}_X \\ -\tilde{r}_S \end{bmatrix},$$

where $$\tilde{H}_{11} = H_{11} + \text{diag}(X)^{-1} \text{diag}(Z_X),$$

-continued $$\tilde{H}_{22} = \text{diag}(S)^{-1}\text{diag}(Z_S),$$

$$\tilde{r}_X = r_X + \text{diag}(X)^{-1} r_{Z_X},$$

$$\tilde{r}_S = r_S + \text{diag}(S)^{-1} r_{Z_S},$$

$$\Delta X = \begin{bmatrix} \{\Delta x_i\} \\ \{\Delta x_{ij}\} \\ \{\Delta u_i\} \\ \{\Delta u_{ij}\} \end{bmatrix},$$

$$\Delta y_1 = \{\Delta y_1^{x_i}\},$$

$$\Delta y_2 = \{\Delta y_2^{x_{ij}}\}.$$

According to a further aspect of the invention, the first block matrix equation is expanded for each bus i and branch(i, j) as follows:

$$\Delta x_i - \sum_j R_{ij} \Delta x_{ij} = r_{y1}^{x_i}$$

$$\Delta x_{ij} - R_{ij}(A_{ij}\Delta u_i + B_{ij}\Delta u_j + C_{ij}\Delta u_{ij} + D_{ij}\Delta u_{ji}) = r_{y2}^{x_{ij}}$$

$$\Delta X = \Delta S = rY,$$

and the second block matrix equation is expanded for each bus i and branch(i, j) as follows:

$$\tilde{V}_i^X \Delta x_i - \Delta Y^{x_i} - \Delta y_1^{x_i} = -\tilde{r}_{x_i}$$

$$\tilde{W}_{ij}^X \Delta x_{ij} - \Delta Y^{x_{ij}} + R_{ij}\Delta y_1^{x_i} - \Delta y_2^{x_{ij}} = -\tilde{r}_{x_{ij}}$$

$$\tilde{V}_i^U \Delta u_i - \Delta Y^{u_i} + \sum_j R_{ij} A_{ij}^T \Delta y_2^{x_{ij}} + \sum_j R_{ji} B_{ji}^T \Delta y_2^{x_{ji}} = -\tilde{r}_{u_i}$$

$$\tilde{W}_{ij}^U \Delta u_{ij} - \Delta Y^{u_{ij}} + R_{ij} C_{ij}^T \Delta y_2^{x_{ij}} + R_{ji} D_{ji}^T \Delta y_2^{x_{ji}} = -\tilde{r}_{u_{ij}}$$

$$\tilde{H}_{22}\Delta S - \Delta Y = -\tilde{r}_S,$$

where the method further comprises solving for the other variables in the block matrix equations in the following order:

$$\{\Delta u_i\},\{\Delta u_{ij}\} \rightarrow \{\Delta x_{ij}\} \rightarrow \{\Delta x_i\} \rightarrow S \rightarrow \Delta Y \rightarrow \Delta y_1 \rightarrow \Delta y_2.$$

According to a further aspect of the invention, the method includes initializing unknowns $[\Delta X^k, \Delta S^k, \Delta Y^k, \Delta y_1^k, \Delta y_2^k]$ where k is an iteration counter, updating the barrier parameter as $\mu^{k+1} \leftarrow \epsilon \cdot \mu^k$, $\epsilon \in (0.1, \ldots, 0.9)$, evaluating $(\Delta X^k, \Delta S^k, \Delta Y^k, \Delta y_1^k, \Delta y_2^k)$ using the two block matrix equations, calculating $(\Delta Z_X^k, \Delta Z_S^k)$, determining a step length $\Delta \beta^k$ from a line search, and updating $$X^{k+1} \leftarrow X^k + \Delta\beta^k \Delta X^k,$$

$$S^{k+1} \leftarrow S^k + \Delta\beta^k \Delta S^k,$$

$$Y^{k+1} \leftarrow Y^k + \Delta\beta^k \Delta Y^k,$$

$$y_1^{k+1} \leftarrow y_1^k + \Delta\beta^k \Delta y_1^k,$$

$$Z_X^{k+1} \leftarrow Z_X^k + \Delta\beta^k \Delta Z_X^k,$$

$$Z_S^{k+1} \leftarrow Z_S^k + \Delta\beta^k \Delta Z_S^k,$$

where the steps of updating the barrier parameter, evaluating $(\Delta X^k, \Delta S^4, \Delta Y^k, \Delta y_i^k, \Delta y_2^k)$, calculating $(\Delta Z_X^k, \Delta Z_S^k)$, determining a step length $\Delta\beta^k$, and updating $X^{k+1}$, $S^{k+1}$, $Y^{k+1}$, $y_1^{k+1}$, $y_2^{k+1}$, $Z_X^{k+1}$ and $Z_S^{k+1}$ are repeated until either a dual gap or a maximum of $(r_X, r_S)$ is less than a pre-specified minimum.

According to a further aspect of the invention, the cost function is, $$f(x, u) = \sum_{i=1}^{N} \left[ \frac{1}{2} x_i^T V_i^X x_i + \frac{1}{2} \sum_{Ki} u_i^{kT} V_i^U u_i^k + S_i^X x_i + S_i^U \sum_{Ki} u_i^k \right] +$$

$$\sum_{i,j=1}^{N} R_{ij} \cdot \left[ \frac{1}{2} x_{ij}^T W_{ij}^X x_{ij} + \frac{1}{2} \sum_{Kij} u_{ij}^{kT} W_{ij}^U u_{ij}^k + T_{ij}^X x_{ij} + T_{ij}^U \sum_{Kik} u_{ij}^k \right],$$

where bus control vector $u_i$ includes voltage magnitudes $V_i$, phase angles $\theta_i$, and shunt switch positions $Q_{i\cdot}$, bus dependent variables vector $x_i$ includes net active $x_i^P$ and reactive $x_i^Q$ power injection, branch control vector $u_{ij}$ includes transformer tap selections $t_{ij}$ and phase shifts $\phi_{ij}$, and dependent branch variable vector $x_{ij}$ includes net active $x_{ij}^P$ and reactive $x_{ij}^Q$ power injections, and connection matrix $$R_{ij} = \begin{cases} 1, & \exists (i, j), \\ 0, & o/w, \end{cases}$$

where $x_i = \sum_{j=1}^{N} R_{ij} \cdot x_{ij}$, where $V^X$ is a Hessian of the objective function with respect to $x_i$, $V^U$ is a Hessian of the objective function with respect to $u_i$, $S^X$ is a gradient of the objective function with respect to $x_i$, $S^U$ is a gradient of the objective function with respect to $u_i$, $W^X$ is a Hessian of the objective function with respect to $x_{ij}$, $W^U$ is a Hessian of the objective function with respect to $u_{ij}$, $T^X$ is a gradient of the objective function with respect to $x_{ij}$, and $T^U$ is a gradient of the objective function with respect to $u_{ij}$, subject to constraints $$x_i^{LB} \le x_i \le x_i^{UB}, u_i^{LB} \le \sum_{Ki} u_i^k \le u_i^{UB},$$

$$x_{ij}^{LB} \le x_{ij} \le x_{ij}^{UB}, u_{ij}^{LB} \le \sum_{Kij} u_{ij}^k \le u_{ij}^{UB},$$

where a control grid is discretized by binary variables $z \in \{0,1\}$ as $$z_i^k u_{ik}^{LB} \le u_i^k \le z_i^k u_{ik}^{UB},$$

$$z_{ij}^k u_{ijk}^{LB} \le u_{ij}^k \le z_{ij}^k u_{ijk}^{UB},$$

where the binary variables are subject to constraints $$z_i^{LB} \le \sum_{Ki} z_i^k \le z_i^{UB}$$

$$z_i^{LB} \le \sum_{Ki} z_i^k \le z_i^{UB}$$

and satisfying a voltage law $x_{ij} = R_{ij} \cdot (\Sigma_{Ki} A_{ij}^k u_i^k + \Sigma_{Kj} B_{ij}^k u_j^k + \Sigma_{Kij} C_{ij}^k u_{ij}^k + \Sigma_{Kji} D_{ij}^k u_{ij}^k)$ where the matrices $A_{ij}^0$, $B_{ij}^0$, $C_{ij}^0$, $D_{ij}^0$, $E_{ij}^0$ can be explicitly pre-calculated for every link (i, j) for a given anchor point $(u_i^0, u_j^0, u_{ij}^0)$.

According to a further aspect of the invention, the cost function is $$f(\tilde{x},u,y,v) = \tfrac{1}{2}[\tilde{x}^T V^X \tilde{x} + u^T V^U u + y^T W^Y y + v^T W^V v] + S^X \tilde{x} + S^U u + T^Y y + T^V v,$$

where bus control vector u includes voltage magnitudes $V_i$, phase angles $\theta_i$, and shunt switch positions $Q_i$, bus dependent variables vector x includes net active $X_i^P$ and reactive $X_i^Q$ power injection, branch control vector v includes transformer tap selections $t_{ij}$ and phase shifts $\phi_{ij}$, and dependent branch variable vector y includes net active $X_{ij}^P$ and reactive $X_{ij}^Q$ power injections, where bus dependent vector is defined as $$x = \tilde{A}\tilde{x} \Leftrightarrow x_i = \sum_{k=1}^{G_i} x_{i,k}^g - \sum_{k=1}^{L_i} x_{i,k}^l + \sum_{k=1}^{SH_i} x_{i,k}^{sh},$$

where $G_i$, $L_i$ and $SH_i$ are the number of generators, loads and shunts placed on bus i and $x_{i,k}^g$, $x_{i,k}^l$ and $x_{i,k}^{sh}$ are the $k^{th}$ active and reactive generation, load and shunt variables at bus i, respectively, and $\tilde{A} \in \{-1,0,1\}^{N \times 2(G+L+SH)}$, where $V^X$ is a Hessian of the objective function with respect to x, $V^U$ is a Hessian of the objective function with respect to u, $S^X$ is a gradient of the objective function with respect to x, $S^U$ is a gradient of the objective function with respect to u, $W^Y$ is a Hessian of the objective function with respect to y, $W^V$ is a Hessian of the objective function with respect to v, $T^Y$ is a gradient of the objective function with respect to y, and $T^V$ is a gradient of the objective function with respect to v, the cost function having connection matrix $$R_{ij} = \begin{cases} 1, & \exists\,(i,j), \\ 0, & o/w, \end{cases}$$

where $a_i \tilde{x} = \sum_{j=1}^{N} R_{ij} y_{ij}$ where $a_i$ is $i^{th}$ is row of matrix $\tilde{A}$, subject to the constraints $$\tilde{x}^{LB} \leq \tilde{x} \leq \tilde{x}^{UB},\ y^{LB} \leq y \leq y^{UB},$$

$$u^{LB} \leq u \leq u^{UB},\ v^{LB} \leq v \leq v^{UB},$$

and satisfying a voltage law $y_{ij} = R_{ij} \cdot (A_{ij}^0 \cdot u_i + B_{ij}^0 \cdot u_j + C_{ij}^0 \cdot v_{ij} + D_{ij}^0 \cdot v_{ji} + E_{ij}^0)$, where the matrices $A_{ij}^0, B_{ij}^0, C_{ij}^0, D_{ij}^0, E_{ij}^0$ can be explicitly pre-calculated for every link (i, j) for a given anchor point $(u_i^0, u_j^0, u_{ij}^0)$.

According to another aspect of the invention, there is provided a method for approximating an optimal power flow of a smart electric power grid, including providing a cost function that models a smart electric power grid having buses $i \in [1,N]$ connected by branches $ij \in [1, N] \times [1, N]$ with connection matrix $$R_{ij} = \begin{cases} 1, & \exists\,(i,j), \\ 0, & o/w, \end{cases}$$

in terms of bus control vector $u_i$ that include voltage magnitudes $V_i$, phase angles $\theta_i$, and shunt switch positions $Q_i$, bus dependent variables vector $x_i$ that include net active $X_i^P$ and reactive $X_i^Q$ power injection, branch control vector $u_{ij}$ that includes transformer tap selections $t_{ij}$ and phase shifts $\phi_{ij}$, and dependent branch variable vector $x_{ij}$, that includes net active $x_{ij}^P$ and reactive $x_{ij}^Q$ power injections, constraining the bus and branch control vectors, and the bus and branch dependent variables vectors based on physical and operational requirements and actual measurements, deriving a set of non-linear vector equations $$\tilde{L} = \begin{bmatrix} \nabla f(X) - \mu/X - Y - y_1^T \nabla o(x_{ij}, x_i) - y_2^T \nabla v(X) \\ -\mu/S - Y \\ -(X + S - X^{UB}) \\ -o(x_{ij}, x_i) \\ -v(X) \end{bmatrix} = 0$$

that minimize the cost function subject to the constraints, from an expression of an extremum of the cost function with respect to all arguments, where $X = (\{x_i\}, \{x_{ij}\}, \{u_i\}, \{u_{ij}\})^T$, bus control vector $u_i$, includes voltage magnitudes $V_i$, phase angles $\theta_i$, and shunt switch positions $Q_i$, bus dependent variables vector x, includes net active $x_i^P$ and reactive $x_i^Q$ power injection, branch control vector $u_{ij}$ includes transformer tap selections $t_{ij}$ and phase shifts $\phi_{ij}$, and dependent branch variable vector $x_{ij}$ includes net active $x_{ij}^P$ and reactive $x_{ij}^Q$ power injections, $S = (\{s_{xi}\}, \{s_{xij}\}, \{s_{ui}\}, \{s_{uij}\})^T$, where $s_{xi}, s_{ui}, s_{xij}, s_{uij}$ are slack variables, $$o(x_{ij}, x_i) = x_{i1} - \sum_{j=1}^{N} R_{ij} \cdot x_{ij1} - b_x,$$

$$v(X) = x_{ij1} - R_{ij} \cdot (A_{ij}^0 \cdot u_{i1} + B_{ij}^0 \cdot u_{j1} + C_{ij}^0 \cdot u_{ij1} + D_{ij}^0 \cdot u_{ji1}) - b_v$$

$b_x$ and $b_v$ are predetermined constants, $$R_{ij} = \begin{cases} 1, & \exists\,(i,j), \\ 0, & o/w, \end{cases}$$

is a connection matrix where $$x_i = \sum_{j=1}^{N} R_{ij} \cdot x_{ij},$$

$$x_{ij} = R_{ij} \cdot (A_{ij}^0 u_i + B_{ij}^0 u_j + C_{ij}^0 u_{ij} + D_{ij}^0 u_{ji} + E_{ij}^0)$$

is a voltage law where the matrices $A_{ij}^0, B_{ij}^0, C_{ij}^0, D_{ij}^0, E_{ij}^0$ can be explicitly pre-calculated for every link (i, j) for a given anchor point $(u_i^0, u_j^0, u_{ij}^0)$, Y, $y_1$, and $y_2$ are dual variables, and $\mu$ is a barrier parameter, re-organizing the vector $\tilde{L}$ as $$\tilde{L} = \begin{bmatrix} \{L^i\} \\ \{L^{ij}\} \end{bmatrix},$$

where each $L^i$ represent the constraints of bus i, and each $L^{ij}$ represents the constraints of branch (i, j), applying Newton's method to every bus $L^i$ and branch $L^{ij}$, to obtain $$H^i \cdot \begin{bmatrix} \Delta X^i \\ \Delta S^i \\ \Delta Y^i \\ \Delta y_1^i \\ \Delta y_2^i \end{bmatrix} = -L^i; H^{ij} \cdot \begin{bmatrix} \Delta X^{ij} \\ \Delta S^{ij} \\ \Delta Y^{ij} \\ \Delta y_1^{ij} \\ \Delta y_2^{ij} \end{bmatrix} = -L^{ij},$$

where $H^i$ and $H^{ij}$ are Jacobian matrices, $\Delta X^i = (\{\Delta x_i\}, \{\Delta u_i\})^T$, $\Delta X^{ij} = (\{\Delta x_{ij}\}, \{\Delta u_{ij}\})$, $\Delta S^i = (\{\Delta s_{xi}\}, \{\Delta s_{ui}\})^T$, $\Delta S^{ij} = (\{\Delta s_{xij}\}, \{\Delta s_{uij}\})$, and $[\Delta X, \Delta S, \Delta Y, \Delta y_1, \Delta y_2]$ are unknowns, and using cutting planes to solve these block-wise Newton's equations, where a solution of the two systems of block matrix equations yields conditions for a lowest cost per kilowatthour delivered through the smart electric power grid.

According to another aspect of the invention, there is provided a non-transitory program storage device readable by a computer, tangibly embodying a program of instructions executed by the computer to perform the method steps for approximating an optimal power flow of a smart electric power grid.

DETAILED DESCRIPTION OF EXEMPLARY EMBODIMENTS

Figure 1:
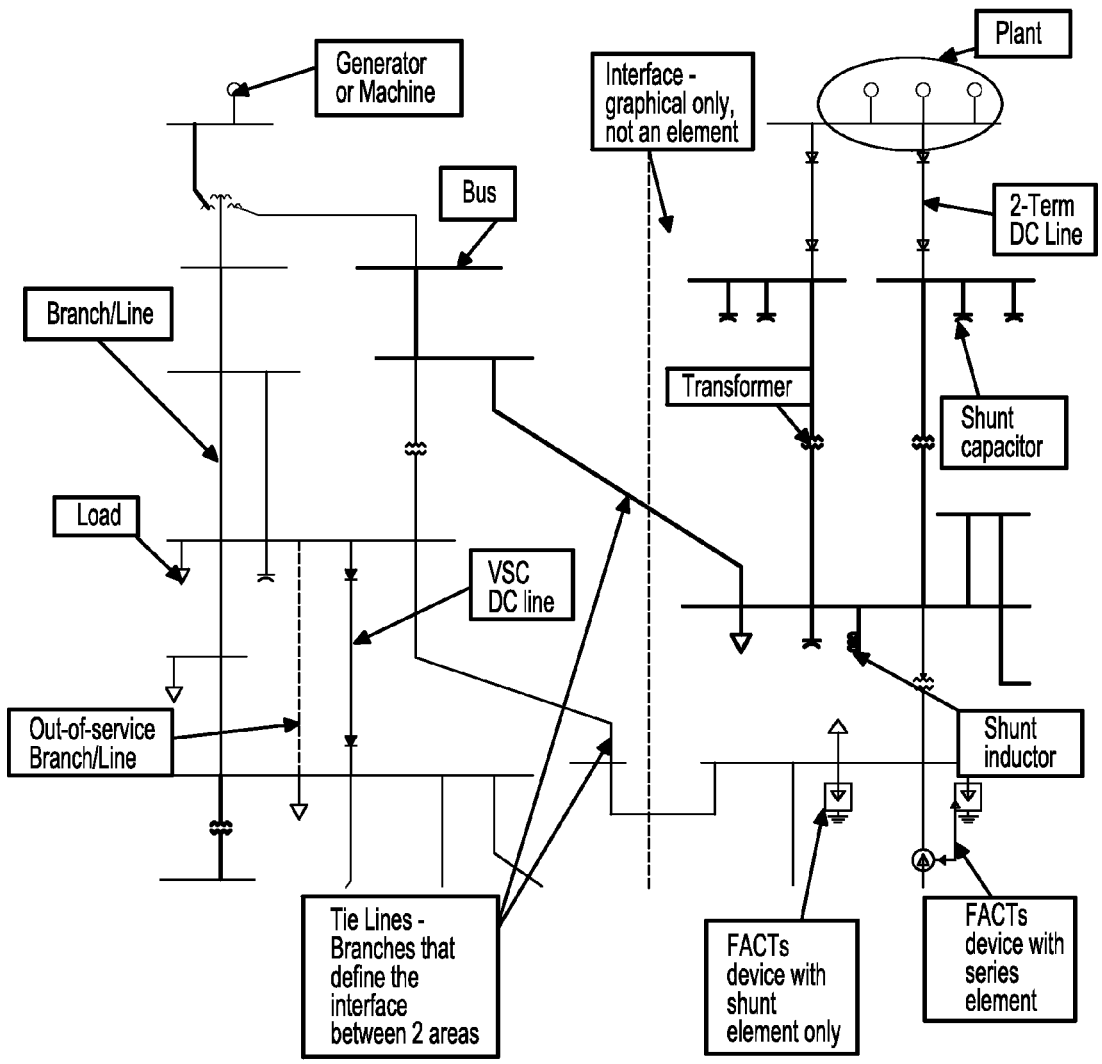
FIG. 1 is a diagram of an exemplary, non-limiting electric power system network, according to an embodiment of the invention.

Exemplary embodiments of the invention as described herein generally include systems and methods for estimating a solution of an optimal power flow model of a smart power grid. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

An optimal power flow (OPF) model seeks to produce an optimal power flow solution that balances generation/consumption for all buses with power distribution across all connected branches such that the overall system state, as measured by underlying physical parameters including voltages and phase angles, is feasible and safe. A basecase OPF model can be used to control AC and DC energy dispatch (i.e. bus generation/load and branch power flow), regulate AC bus voltages and phase angles, select AC transformer/phasor taps and shunt switches, and control an AC/DC converter.

Solver Model Specification

An electric grid Optimal Power Flow (OPF) model according to an embodiment of the invention includes buses $i \in [1,N]$ connected by branches $ij \in [1,N] \times [1,N]$. The AC-AC branch (i.e., a branch obeying alternating current physics laws) connection matrix R is given as:

$$R_{ij} = \begin{cases} 1, & \exists (i,j), \\ 0, & o/w. \end{cases}$$

Minimal AC OPF Model Specification

A minimal OPF model according to an embodiment of the invention assumes an AC-only grid with continuous-only state-dependent variables x and controls u. In addition to that, there are no thermal capacity limits enforced on branch power flows. Finally, discrete logic z defining a linearization region of the originally non-convex AC voltage law constraints is assumed to be a fixed binary vector $z_0$.

Box-Constraints:

According to an embodiment of the invention, the following two box-constraint families are defined that independently limit bus control vector $u_i$ and dependent bus variable vector $x_i$:

$$x_i^{LB} \leq x_i \leq x_i^{UB},$$

$$u_i^{LB} \leq u_i \leq u_i^{UB}, \tag{1}$$

where the superscripts LB and UB refer to lower bound and upper bound, respectively. Bus control vector $u_i$ typically includes voltage magnitude $V_i$, log-scaled in this model, phase angle $\theta_i$, and shunt switch position $Q_{i\cdot}$. Bus dependent variables vector $x_i$ typically includes net active $x_i^P$ and reactive $x_i^Q$ power injection. Similarly, according to an embodiment of the invention, a box-constraint family is defined for branch variables that independently limit branch control vector $u_{ij}$, which typically includes transformer tap selection $t_{ij}$ and phase shift $\phi_{ij}$, and dependent branch variable vector $x_{ij}$, which typically includes net active $x_{ij}^P$ and reactive $x_{ij}^Q$ power injections:

$$x_{ij}^{LB} \leq x_{ij} \leq x_{ij}^{UB},$$

$$u_{ij}^{LB} \leq u_{ij} \leq u_{ij}^{UB}, \tag{2}$$

Flow Balance:

At every bus a net power injection balance should be maintained between a bus and connected branches. Branch dependent variables vector $x_{ij}$, in which typically $x_{ij} = (x_{ij}^P, x_{ij}^Q)$, can be defined to specify this balance as follows:

$$x_i = \sum_{j=1}^{N} R_{ij} \cdot x_{ij}. \tag{3}$$

The matrix R is always highly sparse since the connection density of real-world power grids is typically 1-5 branches per bus.

Discrete Control Grid:

Some of the components in bus control vector $u_i$ may be discrete, while others may be continuous. According to an embodiment of the invention, there is a minimal discretization of the overall Cartesian product space of the vector $u_i$ into intervals $k \in [1, K_i]$ each defined by a box $[u_{ik}^{LB}, u_{ik}^{UB}]$, a fixed anchor vector $u_{ik}^0$ and a binary choice variable $z_{ik}$. The latter is assumed fixed at $z_{ik}^0$ in this minimal AC OPF specification. Then, a discrete control grid is given by the following discrete box-constraint family:

$$\sum_{k=1}^{K_i} Z_{ik}^0 u_{ik}^{LB} \le u_i \le \sum_{k=1}^{K_i} Z_{ik}^0 u_{ik}^{UB}. \quad (4)$$

Similarly, according to an embodiment of the invention, a discrete control grid is defined for the branch control vector $u_{ij}$ defined by $k \in [1,K_{ij}]$ intervals each defined by a box $[u_{ijk}^{LB}, u_{ijk}^{UB}]$, a fixed anchor $u_{ijk}^0$ and a binary choice variable $z_{ijk}$, assumed fixed at $z_{ijk}^0$ in this minimal AC OPF specification:

$$\sum_{k=1}^{K_{ji}} Z_{ijk}^0 u_{ijk}^{LB} \le u_{ij} \le \sum_{k=1}^{K_{ij}} Z_{ijk}^0 u_{ijk}^{UB}. \quad (5)$$

Discretized Voltage Law:

Each interval k implies a new feasibility set $X_{ij}^k$ for the branch power flow vector $x_{ij}$ represented as a rectangle generated by intervals $[u_{ik}^{LB}, u_{ik}^{UB}]$, $[u_{jk}^{LB}, u_{jk}^{UB}]$, and $[u_{ijk}^{LB}, u_{ijk}^{UB}]$, following the voltage law gradient lines drawn at the combined anchor point $(u_{ik}^0, u_{jk}^0, u_{ijk}^0)$. According to an embodiment of the invention, the feasibility set $X_{ij}^k$ is not explicitly included in the model specification. Instead, a discretized version of the AC voltage law is provided that defines the relation between branch power flow vectors $x_{ij}$ and control vectors $u_i$, $u_j$, $u_{ij}$ that are linearized with respect to a given anchor point $(u_i^0, u_j^0, u_{ij}^0)$ that is typically given by the grid anchor point $(u_{ik}^0, u_{jk}^0, u_{ijk}^0)$ corresponding to $z_{ik}^0$ and $z_{ijk}^0$. Then, an embodiment of the invention assumes the following form of the discretized AC voltage law:

$$x_{ij} = R_{ij} \cdot (A_{ij}^0 u_i + B_{ij}^0 u_j + C_{ij}^0 u_{ij} + D_{ij}^0 u_{ji} + E_{ij}^0). \quad (6)$$

Note that this constraint exhibits two types of sparsity: one inherited from $R_{ij}$ and the other due to dependence on only two control vectors $(u_i, u_j)$ and $(u_{ij}, u_{ji})$ instead of the whole-grid control vector $U = [(u_i)_{i=1}^N, (u_{ij})_{i,j=1}^N]$. The matrices $A_{ij}^0$, $B_{ij}^0$, $C_{ij}^0$, $D_{ij}^0$, $E_{ij}^0$ can be explicitly pre-calculated for every link $(i, j)$ for the given anchor point $(u_i^0, u_j^0, u_{ij}^0)$.

Objective Function:

According to an embodiment of the invention, it is assumed that there exists a generic convex quadratic cost function to be minimized. This function includes terms related to managing the control vector $u_i$ that minimizes control adjustment costs, bus dependent variables vector $x_i$ that minimize generation costs, and branch dependent variables vector $x_{ij}$ that minimize transmission losses:

$$f(x, u) = \sum_{i=1}^N \left[ \frac{1}{2} x_i^T V_i^X x_i + \frac{1}{2} u_i^T V_i^U u_i + S_i^X x_i + S_i^U u_i \right] + \sum_{i,j=1}^N R_{ij} \cdot \left[ \frac{1}{2} x_{ij}^T W_{ij}^X x_{ij} + \frac{1}{2} u_{ij}^T W_{ij}^U u_{ij} + T_{ij}^X x_{ij} + T_{ij}^U u_{ij} \right], \quad (7)$$

where:
$V^X$ is a Hessian of the objective function with respect to $x_i$,
$V^U$ is a Hessian of the objective function with respect to $u_i$,
$S^X$ is a gradient of the objective function with respect to $x_i$,
$S^U$ is a gradient of the objective function with respect to $u_i$,
$W^X$ is a Hessian of the objective function with respect to $x_{ij}$,
$W^U$ is a Hessian of the objective function with respect to $u_{ij}$,
$T^X$ is a gradient of the objective function with respect to $x_{ij}$,
and
$T^U$ is a gradient of the objective function with respect to $u_{ij}$.

Discrete AC OPF Model Specification

A discrete OPF model according to an embodiment of the invention assumes that a discrete logic z defines a linearization region of the originally non-convex AC voltage law constraints is also a model variable that is constrained to be a binary $z \in \{0,1\}$. A discrete OPF model according to an embodiment of the invention has a form similar to the minimal OPF except for the following changes:

Box-Constraints:

The dependent variables box-bounds remain unchanged:

$$x_i^{LB} \le x_i \le x_i^{UB},$$

$$x_{ij}^{LB} \le x_{ij} \le x_{ij}^{UB}. \quad (8)$$

However, the box-bound constraints for control variables $u_i$ and $u_{ij}$ are changed to have the following simplex form:

$$u_i^{LB} \le \sum_{Ki} u_i^k \le u_i^{UB} \quad (9)$$

$$u_{ij}^{LB} \le \sum_{Kij} u_{ij}^k \le u_{ij}^{UB}.$$

Also, a simplex form is introduced for the discrete variables:

$$z_i^{LB} \le \sum_{Ki} z_i^k \le z_i^{UB} \quad (10)$$

$$z_i^{LB} \le \sum_{Ki} z_i^k \le z_i^{UB}$$

Discrete Control Grid:

$$z_i^k u_{ik}^{LB} \le u_i^k \le z_i^k u_{ik}^{UB},$$

$$z_{ij}^k u_{ijk}^{LB} \le u_{ij}^k \le z_{ij}^k u_{ijk}^{UB}. \quad (11)$$

Note that the vector $u_{ij}^k$ of branch control variables, constrained within a discrete control grid interval k, now also includes power flow anchor points $(P_{ij}^k, Q_{ij}^k)$ for every branch.

Discretized Voltage Law.

$$x_{ij} = R_{ij} \cdot (\Sigma_{Ki} A_{ij}^k u_i^k + \Sigma_{Kj} B_{ij}^k u_j^k + \Sigma_{Kij} C_{ij}^k u_{ij}^k + \Sigma_{Kji} D_{ij}^k u_{ji}^k) \quad (12)$$

Objective Function:

$$f(x, u) = \sum_{i=1}^N \left[ \frac{1}{2} x_i^T V_i^X x_i + \frac{1}{2} \sum_{Ki} u_i^{kT} V_i^U u_i^k + S_i^X x_i + S_i^U \sum_{Ki} u_i^k \right] + \sum_{i,j=1}^N R_{ij} \cdot \left[ \frac{1}{2} x_{ij}^T W_{ij}^X x_{ij} + \frac{1}{2} \sum_{Kij} u_{ij}^{kT} W_{ij}^U u_{ij}^k + T_{ij}^X x_{ij} + T_{ij}^U \sum_{Kik} u_{ij}^k \right] \quad (13)$$

Interior Point Method Solver Math for a Minimal AC OPF Model

First, a model according to an embodiment of the invention is standardized to the following format:

$$\min f(x, u) = \qquad (14.1)$$

$$\sum_{i=1}^{N} \left[ \frac{1}{2} x_{i1}^T \cdot V_i^X \cdot x_{i1}^T + \frac{1}{2} u_{i1}^T \cdot V_i^U u_{i1}^T + S_{i1}^X \cdot x_{i1} + S_{i1}^U \cdot u_{i1} \right] +$$

$$\sum_{i,j=1}^{N} R_{ij} \cdot \left[ \begin{array}{c} \frac{1}{2} x_{ij1}^T \cdot W_{ij}^X \cdot x_{ij1}^T + \\ \frac{1}{2} u_{ij}^T \cdot W_{ij}^U \cdot u_{ij1}^T + T_{ij1}^X \cdot x_{ij1} + T_{ij1}^U \cdot u_{ij1} \end{array} \right]$$

$$X + S = X^{UB} \begin{cases} x_{i1} + s_{xi} = x_{i1}^{UB} \\ u_{i1} + s_{ui} = u_{i1}^{UB} \\ x_{ij1} + s_{xij} = x_{ij1}^{UB} \\ u_{ij1} + s_{uij} = u_{ij1}^{UB} \end{cases} \qquad (14.2)$$

$$x_{i1} - \sum_{j=1}^{N} R_{ij} \cdot x_{ij1} = b_x \qquad (14.3)$$

$$x_{ij1} - R_{ij} \cdot (A_{ij}^0 \cdot u_{i1} + B_{ij}^0 \cdot u_{j1} + C_{ij}^0 \cdot u_{ij1} + D_{ij}^0 \cdot u_{ji1}) = b_v \qquad (14.4)$$

$$x_{i1}, x_{ij1}, u_{i1}, u_{ij1}, s_{xi}, s_{ui}, s_{xij}, s_{uij} \geq 0, \qquad (14.5)$$

where $X=(\{x_{i1}\}, \{x_{ij1}\}, \{u_{i1}\}, \{u_{ij1}\})^T$, $s_{xi}$, $s_{ui}$, $s_{xij}$, $s_{uij}$ are slack variables, $S=(\{s_{xi}\}, \{s_{xij}\}, \{s_{ui}\}, \{s_{uij}\})^T$, and $$x_{i1} = x_i - x_i^{LB}, \qquad (15.1)$$
$$x_{ij1} = x_{ij} - x_{ij}^{LB},$$
$$x_{i1}^{UB} = x_i^{UB} - x_i^{LB},$$
$$x_{ij1}^{UB} = x_{ij}^{UB} - x_{ij}^{LB},$$

$$u_{i1} = u_i - \max\left\{ u_i^{LB}, \sum_{k=1}^{K_i} z_{ik}^0 \cdot u_{ik}^{LB} \right\}, \qquad (15.2)$$

$$u_{ij1} = u_{ij} - \max\left\{ u_{ij}^{LB}, \sum_{k=1}^{K_{ij}} z_{ijk}^0 \cdot u_{ijk}^{LB} \right\},$$

$$u_{i1}^{UB} = \min\left\{ u_i^{UB}, \sum_{k=1}^{K_i} z_{ik}^0 \cdot u_{ik}^{UB} \right\} - \max\left\{ u_i^{LB}, \sum_{k=1}^{K_i} z_{ik}^0 \cdot u_{ik}^{LB} \right\}, \qquad (15.3)$$

$$u_{ij1}^{UB} = \min\left\{ u_{ij}^{UB}, \sum_{k=1}^{K_{ij}} z_{ijk}^0 \cdot u_{ijk}^{UB} \right\} - \max\left\{ u_{ij}^{LB}, \sum_{k=1}^{K_{ij}} z_{ijk}^0 \cdot u_{ijk}^{LB} \right\},$$

$$b_x = \sum_{j=1}^{N} R_{ij} \cdot x_{ij}^{LB} - x_i^{LB}, \qquad (15.4)$$

$$b_v = \qquad (15.5)$$

$$R_{ij} \cdot \left( A_{ij}^0 \cdot \max\left\{ u_i^{LB}, \sum_{k=1}^{K_i} z_{ik}^0 \cdot u_{ik}^{LB} \right\} + B_{ij}^0 \cdot \max\left\{ u_j^{LB}, \sum_{k=1}^{K_i} z_{ik}^0 \cdot u_{jk}^{LB} \right\} + \right.$$

$$C_{ij}^0 \cdot \max\left\{ u_{ij}^{LB}, \sum_{k=1}^{K_{ij}} z_{ijk}^0 \cdot u_{ijk}^{LB} \right\} +$$

$$\left. D_{ij}^0 \cdot \max\left\{ u_{ij}^{LB}, \sum_{k=1}^{K_{ij}} z_{ijk}^0 \cdot u_{jik}^{LB} \right\} + E_{ij1}^0 \right) - x_{ij}^{LB}.$$

The coefficients of the objective function can also be changed:

$$S_{i1}^X = S_i^X + x_i^{LB} \cdot V_i^X, \qquad (16)$$

$$S_{i1}^U = S_i^U + \max\left\{ u_j^{LB}, \sum_{k=1}^{K_i} z_{ik}^0 \cdot u_{jk}^{LB} \right\} \cdot V_i^U,$$

$$T_{ij1}^X = T_{ij}^X + x_i^{LB} \cdot W_{ij}^X,$$

$$T_{ij1}^U = T_{ij}^U + \max\left\{ u_j^{LB}, \sum_{k=1}^{K_i} z_{ik}^0 \cdot u_{jk}^{LB} \right\} \cdot W_{ij}^U,$$

Let $$v(X) = x_{ij1} - R_{ij} \cdot (A_{ij}^0 \cdot u_{i1} + B_{ij}^0 \cdot u_{j1} + C_{ij}^0 \cdot u_{ij1} + D_{ij}^0 \cdot u_{ji1}) - b_v. \qquad (17)$$

$$o(x_{ij}, x_i) = x_{i1} - \sum_{j=1}^{N} R_{ij} \cdot x_{ij1} - b_x. \qquad (18)$$

Then, by introducing logarithmic barrier terms, one can obtain the following Lagrangian function:

$$L_\mu(X,S) = f(X) - \mu^T(\ln X + \ln S) - Y^T(X+S-X^{UB}) - y_1^T o(x_{ij},x_i) - y_2^T v(X)) \qquad (19)$$

where $X=(\{x_{i1}\}, \{x_{ij1}\}, \{u_{i1}\}, \{u_{ij1}\})^T$, $S=(\{s_{xi}\}, \{s_{xij}\}, \{s_{ui}\}, \{s_{uij}\})^T$. The Lagrange multipliers Y and y are called dual variables. According to an embodiment of the invention, the Karush-Kuhn-Tucker (KKT) optimality conditions of the barrier system may be obtained from the gradient of the Lagrangian with respect to all variables, and solving for the extremum:

$$\begin{bmatrix} \nabla L_X \\ \nabla L_S \\ \nabla L_Y \\ \nabla L_{y_1} \\ \nabla L_{y_2} \end{bmatrix} = \begin{bmatrix} \nabla f(X) - \mu/X - Y - y_1^T \nabla o(x_{ij}, x_i) - y_2^T \nabla v(X) \\ -\mu/S - Y \\ -(X + S - X^{UB}) \\ -o(x_{ij}, x_i) \\ -v(X) \end{bmatrix} = 0. \qquad (20)$$

Introducing variables $Z_x = \mu/X$, $Z_s = \mu/S$ transforms EQ. (20) into:

$$\begin{bmatrix} \nabla f(X, Y) - Z_x - Y - y_1^T \nabla o(x_{ij}, x_i) - y_2^T \nabla v(X) \\ -Y - Z_x \\ -(X + S - X^{UB}) \\ -o(x_{ij}, x_i) \\ -v(X) \\ Z_x \cdot X - \mu e \\ Z_s \cdot S - \mu e \end{bmatrix} = 0, \qquad (21)$$

where e is a unit vector. Newton's method can be used to solve the above non-linear equation, to yield the following linear equation:

$$H \cdot \begin{bmatrix} \Delta X \\ \Delta S \\ \Delta Y \\ \Delta y_1 \\ \Delta y_2 \\ \Delta Z_x \\ \Delta Z_s \end{bmatrix} = - \begin{bmatrix} \nabla f(X, Y) - Z_x - Y - y_1 \cdot \nabla o(x_{ij}, x_i) - y_2 \cdot \nabla v(X) \\ -Y - Z_s \\ -(X + S - X^{UB}) \\ -o(x_{ij}, x_i) \\ -v(X) \\ Z_S \cdot X - \mu e \\ Z_S \cdot S - \mu e \end{bmatrix} \qquad (22)$$

in which H is the following Jacobian matrix:

$$H = \begin{bmatrix} H_{11} & 0 & -I & H_{41}^T & H_{51}^T & -I & 0 \\ 0 & 0 & -I & 0 & 0 & 0 & -I \\ -I & -I & 0 & 0 & 0 & 0 & 0 \\ H_{41} & 0 & 0 & 0 & 0 & 0 & 0 \\ H_{51} & 0 & 0 & 0 & 0 & 0 & 0 \\ \text{diag}(Z_X) & 0 & 0 & 0 & 0 & \text{diag}(X) & 0 \\ 0 & \text{diag}(Z_S) & 0 & 0 & 0 & 0 & \text{diag}(S) \end{bmatrix}, \quad (23)$$

where $$H_{11} = \text{diag}(V^X, W^X, V^U, W^U), \quad (24.1)$$

where diag( ) is a vector formed from the diagonal components of the matrix argument, $$H_{41} = [-I, R, 0, 0], \quad (24.2)$$

$$R = \begin{pmatrix} [R_{11}I \ldots R_{1N_1}I] & 0 & \ldots & 0 \\ 0 & [R_{21}I \ldots R_{2N_2}I] & \ldots & 0 \\ 0 & \vdots & \ddots & \vdots \\ 0 & \ldots & 0 & [R_{N_1 1}I \ldots R_{N_1 N_1}I] \end{pmatrix} \quad (24.3)$$

and the row of branch (i, j) of $H_{51}$ is $$(H_{51})_{ij} = [0, -I, \ldots R_{ij}A_{ij}^0, \ldots R_{ij}B_{ij}^0, \ldots R_{ij}C_{ij}^0, \ldots R_{ij}D_{ij}^0, \ldots 0]. \quad (24.4)$$

Note that, in EQ. (24.1), the arguments $V^X$, $W^X$, $V^U$, $W^U$ themselves form a block diagonal $$\text{matrix} \begin{bmatrix} V^X & 0 & 0 & 0 \\ 0 & W^X & 0 & 0 \\ 0 & 0 & V^U & 0 \\ 0 & 0 & 0 & W^U \end{bmatrix}. \quad (25)$$

Define $$\begin{bmatrix} r_X \\ r_S \\ r_Y \\ r_{y_1} \\ r_{y_2} \\ r_{Z_x} \\ r_{Z_s} \end{bmatrix} = \begin{bmatrix} \nabla f(X) - Z_x - Y - y_1^T \nabla o(x_{ij}, x_i) - y_2^T \nabla v(X) \\ -Y - Z_s \\ -(X + S - X^{UB}) \\ -o(x_{ij}, x_i) \\ -v(X) \\ Z_x \cdot X - \mu e \\ Z_s \cdot S - \mu e \end{bmatrix}.$$

Then, $$\begin{bmatrix} H_{11} & 0 & -I & H_{41}^T & H_{51}^T & -I & 0 \\ 0 & 0 & -I & 0 & 0 & 0 & -I \\ -I & -I & 0 & 0 & 0 & 0 & 0 \\ H_{41} & 0 & 0 & 0 & 0 & 0 & 0 \\ H_{51} & 0 & 0 & 0 & 0 & 0 & 0 \\ \text{diag}(Z_X) & 0 & 0 & 0 & 0 & \text{diag}(X) & 0 \\ 0 & \text{diag}(Z_S) & 0 & 0 & 0 & 0 & \text{diag}(S) \end{bmatrix} \begin{bmatrix} \Delta X \\ \Delta S \\ \Delta Y \\ \Delta y_1 \\ \Delta y_2 \\ \Delta Z_x \\ \Delta Z_s \end{bmatrix} = -\begin{bmatrix} r_X \\ r_S \\ r_Y \\ r_{y_1} \\ r_{y_2} \\ r_{Z_x} \\ r_{Z_s} \end{bmatrix}. \quad (26)$$

Note that the dimension of the system of EQS. (26) can be very large. As a result the solution time needed to solve it may be prohibitive for large scale electrical networks. However, a procedure according to an embodiment of the invention that uses a series of back substitutions, described below, can reduce the dimensionality of the system so that the equations require much less computational time to solve.

According to an embodiment of the invention, to solve these Newton equations, the dimension can be reduced as follows. From the last two equations, one can obtain:

$$\Delta Z_x = \text{diag}(X)^{-1}(-r_{Z_x} - \text{diag}(Z_X)\Delta X)$$

$$\Delta Z_s = \text{diag}(S)^{-1}(-r_{Z_s} - \text{diag}(Z_S)\Delta S) \quad (27)$$

The solutions of EQS. (27) can be substituted into the other equations of EQS. (26), which can be reorganized into primal and dual parts:

$$\begin{bmatrix} H_{41} & 0 & | & 0 & 0 & 0 \\ H_{51} & 0 & | & 0 & 0 & 0 \\ -I & -I & | & 0 & 0 & 0 \\ - & - & & - & - & - \\ H_{11} + \text{diag}(X)^{-1}\text{diag}(Z_x) & 0 & | & -I & H_{41}^T & H_{51}^T \\ 0 & \text{diag}(S)^{-1}\text{diag}(Z_S) & | & -I & 0 & 0 \end{bmatrix} \quad (28)$$

$$\begin{bmatrix} \Delta X \\ \Delta S \\ - \\ \Delta Y \\ \Delta y_1 \\ \Delta y_2 \end{bmatrix} = \begin{bmatrix} -r_{y_1} \\ -r_{y_2} \\ -r_Y \\ - \\ -r_x - \text{diag}(X)^{-1}r_{Z_x} \\ -r_s - \text{diag}(S)^{-1}r_{Z_s} \end{bmatrix}$$

By defining $$\tilde{H}_{11} = H_{11} + \text{diag}(X)^{-1}\text{diag}(Z_x) \quad (29)$$

$$\tilde{H}_{22} = \text{diag}(S)^{-1}\text{diag}(Z_S)$$

$$\tilde{r}_x = r_x + \text{diag}(X)^{-1}r_{Z_x}$$

$$\tilde{r}_s = r_s + \text{diag}(S)^{-1}r_{Z_s}$$

$$\Delta X = \begin{bmatrix} \{\Delta x_i\} \\ \{\Delta x_{ij}\} \\ \{\Delta u_i\} \\ \{\Delta u_{ij}\} \end{bmatrix}$$

$$\Delta y_1 = \{\Delta y_1^{x_i}\}$$

$$\Delta y_2 = \{\Delta y_2^{x_{ij}}\}$$

one can obtain, according to an embodiment of the invention:

$$\begin{bmatrix} H_{41} & 0 \\ H_{51} & 0 \\ -I & -I \end{bmatrix} \begin{bmatrix} \Delta X \\ \Delta S \end{bmatrix} = \begin{bmatrix} -r_{y_1} \\ -r_{y_2} \\ -r_Y \end{bmatrix}, \quad (30)$$

and $$\begin{bmatrix} \tilde{H}_{11} & 0 \\ 0 & \tilde{H}_{22} \end{bmatrix} \begin{bmatrix} \Delta X \\ \Delta S \end{bmatrix} + \begin{bmatrix} -I & H_{41}^T & H_{51}^T \\ -I & 0 & 0 \end{bmatrix} \begin{bmatrix} \Delta Y \\ \Delta y_1 \\ \Delta y_2 \end{bmatrix} = \begin{bmatrix} -\tilde{r}_x \\ -\tilde{r}_s \end{bmatrix}. \quad (31)$$

More specifically, EQS. (30) and (31) can be expanded using the definitions of EQS. (24.1)-(24.4) and the model definitions of EQS. (14.1)-(14.5) and (15.1)-(15.5). Thus, EQ. (30) has the following expanded form for each bus i and branch(i, j):

$$\Delta x_i - \sum_j R_{ij}\Delta x_{ij} = r_{y_1}^{x_i} \quad (32)$$

$$\Delta x_{ij} - R_{ij}(A_{ij}\Delta u_i + B_{ij}\Delta u_j + C_{ij}\Delta u_{ij} + D_{ij}\Delta u_{ji}) = r_{y_2}^{x_{ij}}$$

$$\Delta X + \Delta S = r_Y$$

Similarly, EQ. (31) has the following expanded form:

$$\tilde{V}_i^X \Delta x_i - \Delta Y^{x_i} - \Delta y_1^{x_i} = -\tilde{r}_{x_i} \quad (33)$$

$$\tilde{W}_{ij}^X \Delta x_{ij} - \Delta Y^{x_{ij}} + R_{ij}\Delta y_1^{x_i} - \Delta y_2^{x_{ij}} = -\tilde{r}_{x_{ij}}$$

$$\tilde{V}_i^U \Delta u_i - \Delta Y^{u_i} + \sum_j R_{ij}A_{ij}^T \Delta y_2^{x_{ij}} + \sum_j R_{ji}B_{ji}^T \Delta y_2^{x_{ji}} = -\tilde{r}_{u_i}$$

$$\tilde{W}_{ij}^U \Delta u_{ij} - \Delta Y^{u_{ij}} + R_{ij}C_{ij}^T \Delta y_2^{x_{ij}} + R_{ji}D_{ji}^T \Delta y_2^{x_{ji}} = -\tilde{r}_{u_{ij}}$$

$$\tilde{H}_{22}\Delta S - \Delta Y = -\tilde{r}_S$$

According to an embodiment of the invention, by first solving for control variables $\Delta U = [\{\Delta u_i\}, \{\Delta u_{ij}\}]^T$ in EQS. (33), the other variables in EQS. (32) and (33) can be solved using the following sequence of substitutions:

$$\{\Delta u_i\}, \{\Delta u_{ij}\} \to \{\Delta x_{ij}\} \to \{\Delta x_i\} \to \Delta S \to \Delta Y \to \Delta y_1 \to \Delta y_2. \quad (34)$$

Figure 2:
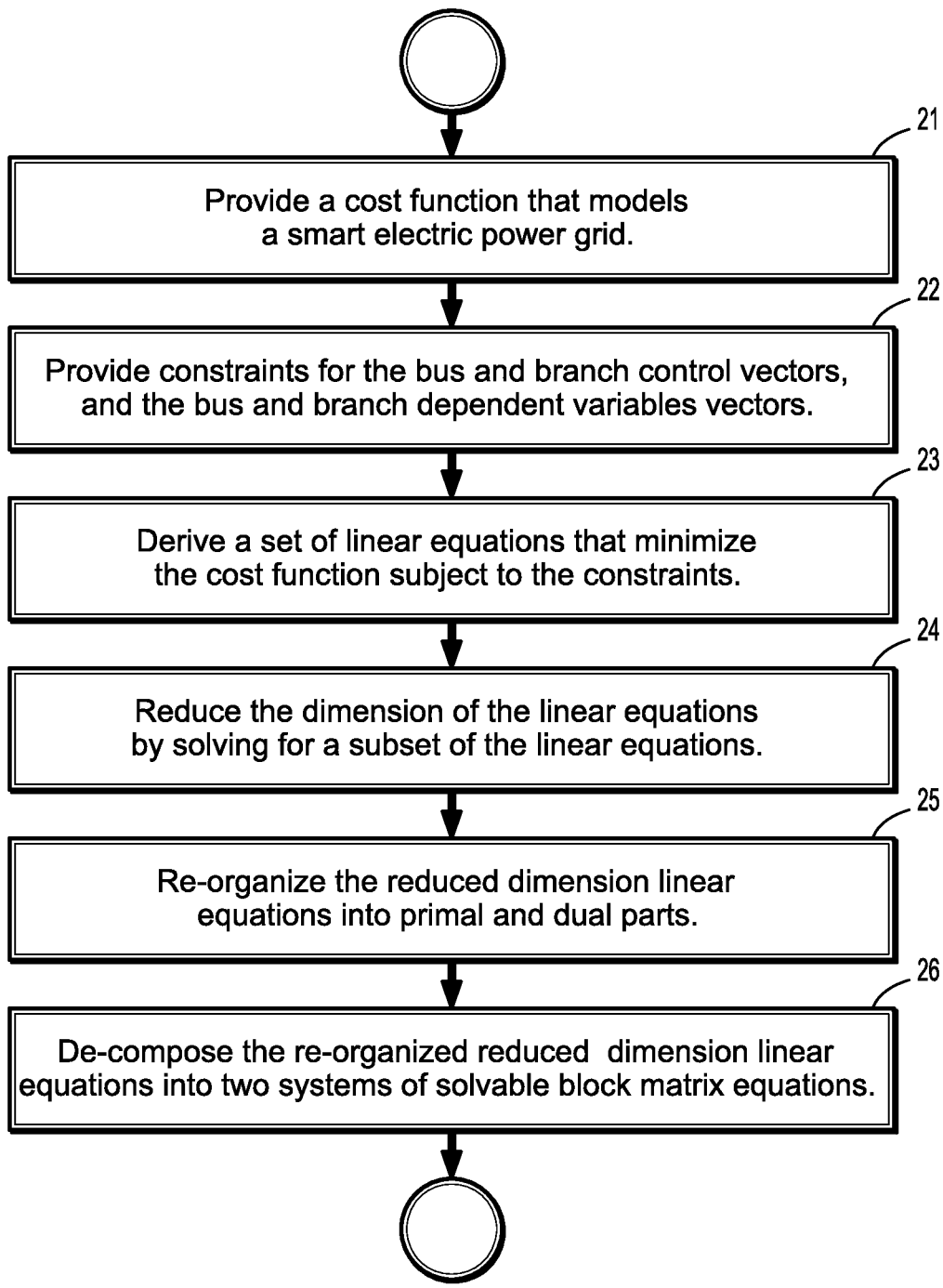
FIG. 2 is a flow chart of an interior point method for solving an optimal power flow model of a smart power grid, according to an embodiment of the invention.

FIG. 2 is a flowchart of a method according to an embodiment of the invention for estimating the optimal power flow of a smart electric power grid. Referring now to the figure, a method according to an embodiment of the invention begins at step 21 by providing a cost function that models a smart electric power grid, such as the cost functions of EQS. (7) and (13), above, and EQ. (64), below. Constraints for the bus and branch control vectors, and the bus and branch dependent variables vectors, are provided at step 22, based on physical and operational requirements and actual measurements. At step 23, a set of linear equations is derived that minimize the cost function subject to the constraints. The dimension of the linear equations can be reduced at step 24 by solving for a subset of the linear equations. The reduced dimension linear equations are re-organized into primal and dual parts at step 25, and the re-organized reduced dimension linear equations are de-composed at step 26 into two systems of block matrix equations that can solved. A solution of the two systems of block matrix equations yields conditions for a lowest cost per kilowatthour delivered through the smart electric power grid.

Coding Details

According to an embodiment of the invention, a preconditioned conjugate gradient method can be used to solve the above equations, which uses a Jacobi preconditioning matrix composed of the diagonal elements of a matrix M of the linear system Mx=b. For every $\Delta u_i$, the diagonal parameter can be computed as:

$$M^{u_i} = \tilde{V}_i^U + I + \sum_j R_{ij} \cdot A_{ij}^T \cdot [(\tilde{W}_{ij}^X + \tilde{H}_{22}^{x_{ij}})A_{ij} + (\tilde{V}_i^X + \tilde{H}_{22}^{x_i})(\sum R_{ij}A_{ij})] + \sum R_{ji} \cdot B_{ji}^T(\tilde{W}_{ji}^X + \tilde{H}_{22}^{x_{ji}} + \tilde{V}_j^X + \tilde{H}_{22}^{x_j})B_{ji}$$

Similarly, for every $\Delta u_{ij}$, the diagonal parameter can be computed as:

$$M^{u_{ij}} = \tilde{W}_{ij}^U + \tilde{H}_{22}^{u_{ij}} + R_{ij} \cdot C_{ij}^T(\tilde{W}_{ij}^X + \tilde{H}_{22}^{x_{ij}} + \tilde{V}_i^X + \tilde{H}_{22}^{x_i})C_{ij} + R_{ji} \cdot D_{ji}^T(\tilde{W}_{ji}^X + \tilde{H}_{22}^{x_{ji}} + \tilde{V}_j^X + \tilde{H}_{22}^{x_j})D_{ji}^T$$

According to an embodiment of the invention, the quadratic objective function $f(X)$ is written as $f(X)=\frac{1}{2}X^TQX+p^TX$, which has the following associated dual program and duality gap:

$$\max P^T Q^{-1} P^T + y_1^T b_x + y_2^T b_v + Y^T X^{UB}$$

$$\text{s.t.} \begin{cases} Z_S + Y \leq 0 \\ Q^{-1}P \geq 0 \\ Z_S \geq 0 \\ Z_X \geq 0 \end{cases}$$

where $$P = p - Z_x - Y - y_1^T \nabla o(X) - y_2^T \nabla v(X).$$

According to an embodiment of the invention, the current duality gap is:

$$f(X) - g(Y, u_1, y_2, Z_S, Z_X) = Y \cdot (-r_Y) + y_1 \cdot (-r_{y_1}) + y_2 \cdot (-r_{y_2}) + \frac{1}{2} r_X^T Q^{-1} r_X^T + (Z_X \cdot X + Z_S \cdot S) - S \cdot (Z_S + Y).$$

In this expression of the duality gap, the first four terms come from the primal infeasibility for the current primal variable (X, S), and the last two terms come from the complementary slackness. When an optimal primal and dual solution is reached, the duality gap is $2n\mu$, where n is the dimension.

Interior Point Method Solver Math for a Discrete AC OPF Model

First, a model according to an embodiment of the invention is standardized to the following format:

$$X + S_X - X^{UB} = 0 \begin{cases} x_i + s_{x_i} = x_i^{UB} \\ x_{ij} + s_{x_{ij}} = x_{ij}^{UB} \end{cases} \quad (35.1)$$

$$MU + NZ + S_U = b \begin{cases} \sum_{Ki} u_i^k - s_{ui}^{1,k} = u_i^{LB} \\ \sum_{Ki} u_i^k + s_{ui}^{2,k} = u_i^{UB} \\ \sum_{Ki} u_{ij}^k - s_{uij}^{1,k} = u_{ij}^{LB} \\ \sum_{Ki} u_{ij}^k + s_{uij}^{1,k} = u_{ij}^{UB} \\ \sum_{Ki} z_i^k - s_{zi}^{1,k} = z_i^{LB} \\ \sum_{Ki} z_i^k + s_{zi}^{2,k} = z_i^{UB} \\ \sum_{Ki} z_{ij}^k - s_{zij}^{1,k} = z_{ij}^{LB} \\ \sum_{Ki} z_{ij}^k + s_{zij}^{2,k} = z_{ij}^{UB} \\ -u_i^k + z_i^k \cdot u_{ik}^{LB} + s_{uzi}^{1,k} = 0 \\ u_i^k - z_i^k \cdot u_{ik}^{UB} + s_{uzi}^{2,k} = 0 \\ -u_{ij}^k + z_{ij}^k \cdot u_{ijk}^{LB} + s_{uzij}^{1,k} = 0 \\ u_{ij}^k - z_{ij}^k \cdot u_{ijk}^{UB} + s_{uzij}^{2,k} = 0 \end{cases} \quad (35.2)$$

$$\alpha(X): \; x_i - \sum_j R_{ij} x_{ij} - b_v = 0 \quad (35.3)$$

$$\beta(X, U): \; x_{ij} - R_{ij} \cdot \left( \sum_{K^i} A_{ij}^k \cdot u_i^k + \sum_{K^i} B_{ij}^k \cdot u_j^k + \sum_{K^{ij}} C_{ij}^k \cdot u_{ij}^k + \sum_{K^{ji}} D_{ij}^k \cdot u_{ji}^k \right) = 0 \quad (35.4)$$

$$\gamma(X, U, Z): \; FX + GU + HZ + J = 0 \quad (35.5)$$

(Cutting planes)

where the variables X, U, Z, M, N, and b are defined as follows:

$$X = \begin{bmatrix} \{x_i\} \\ \{x_{ij}\} \end{bmatrix} \quad (36.1)$$

$$U = \begin{bmatrix} \{u_i^k\} \\ \{x_{ij}^k\} \end{bmatrix}$$

$$Z = \begin{bmatrix} \{z_i^k\} \\ \{z_{ij}^k\} \end{bmatrix}$$

$$M = \begin{bmatrix} -E_1 & 0 \\ E_1 & 0 \\ 0 & -E_1 \\ 0 & E_1 \\ 0 & 0 \\ 0 & 0 \\ 0 & 0 \\ 0 & 0 \\ -I & 0 \\ I & 0 \\ 0 & -I \\ 0 & I \end{bmatrix} \quad (36.2)$$

$$N = \begin{bmatrix} 0 & 0 \\ 0 & 0 \\ 0 & 0 \\ 0 & 0 \\ -E_1 & 0 \\ E_1 & 0 \\ 0 & -E_1 \\ 0 & E_1 \\ I_1 & 0 \\ -I_2 & 0 \\ 0 & I_3 \\ 0 & I_4 \end{bmatrix}$$

$$b = \begin{bmatrix} \{-u_i^{LB}\} \\ \{u_i^{UB}\} \\ \{-u_{ij}^{LB}\} \\ \{u_{ij}^{UB}\} \\ \{-z_i^{LB}\} \\ \{z_i^{UB}\} \\ \{-z_{ij}^{LB}\} \\ \{z_{ij}^{UB}\} \\ 0 \\ 0 \\ 0 \\ 0 \end{bmatrix}$$

and where $$E_1 = \begin{bmatrix} e^T & 0 & \cdots & 0 \\ 0 & e^T & \cdots & 0 \\ 0 & 0 & \ddots & \vdots \\ 0 & 0 & \cdots & e^T \end{bmatrix} \quad (36.3)$$

$$I_1 = \text{diag}\{u_{ik}^{LB}\} \quad (36.4)$$

$$I_2 = \text{diag}\{u_{ik}^{UB}\}$$

$$I_3 = \text{diag}\{u_{ijk}^{LB}\}$$

$$I_4 = \text{diag}\{u_{ijk}^{uB}\}$$

Following the above notation, a Lagrangian function according to an embodiment of the invention can be formulated as follows:

$$L = f(X,U) + \mu^T(\ln X + \ln U + \ln Z + \ln S_X + \ln S_U) + \lambda_1^T(X + S_X - X^{UB}) + \lambda_2^T(MU + NZ + S_U - b) + y_1^T\alpha(X) + y_2^T\beta(X, U) + y_3^T\gamma(X,U,Z) \quad (37)$$

The KKT first order optimality conditions of the resulting program are:

$$\begin{bmatrix} \nabla L_X \\ \nabla L_U \\ \nabla L_Z \\ \nabla L_{S_X} \\ \nabla L_{S_U} \\ \nabla L_{\lambda_1} \\ \nabla L_{\lambda_2} \\ \nabla L_{y_1} \\ \nabla L_{y_2} \\ \nabla L_{y_3} \end{bmatrix} = \quad (38)$$

$$\begin{bmatrix} f_X(X,U) + \mu/X + \lambda_1^T + y_1^T \alpha_X(X) + y_2^T \beta_X(X,U) + \\ y_3^T \gamma_X(X,U,Z) \\ f_U(X,U) + \mu/U + y_2^T \beta_U(X,U) + y_3^T \gamma_U(X,U,Z) \\ \mu/Z + \lambda_2^T N + y_3^T \gamma_Z(X,U,Z) \\ \mu/S_X + \lambda_1^T \\ \mu/S_U + \lambda_2^T \\ X + S_X - X^{UB} \\ MU + NZ + S_U - b \\ \alpha(X) \\ \beta(X,U) \\ \gamma(X,U,Z) \end{bmatrix} = 0$$

By introducing $$T = \begin{bmatrix} T_X \\ T_U \\ T_Z \\ T_{S_X} \\ T_{S_U} \end{bmatrix} = \begin{bmatrix} \mu/X \\ \mu/U \\ \mu/Z \\ \mu/S_X \\ \mu/S_U \end{bmatrix} \quad (39)$$

The optimality conditions can be rewritten as $$\begin{bmatrix} f_X(X,U) + T_X + \lambda_1^T + y_1^T \alpha_X(X) + \\ y_2^T \beta_X(X,U) + y_3^T \gamma_X(X,U,Z) \\ f_U(X,U) + T_U + y_2^T \beta_U(X,U) + y_3^T \gamma_U(X,U,Z) \\ T_Z + \lambda_2^T N + y_3^T \gamma_Z(X,U,Z) \\ T_{S_X} + \lambda_1^T \\ T_{S_U} + \lambda_2^T \\ X + S_X - X^{UB} \\ MU + NZ + S_U - b \\ \alpha(X) \\ \beta(X,U) \\ \gamma(X,U,Z) \\ T \cdot \begin{bmatrix} X \\ U \\ Z \\ S_X \\ S_U \end{bmatrix} - \mu e \end{bmatrix} = 0. \quad (40)$$

Newton's method can be used to solve the above non-linear equation, to yield the following linear equation:

$$H \cdot \begin{bmatrix} \Delta X \\ \Delta U \\ \Delta Z \\ \Delta S_X \\ \Delta S_U \\ \Delta \lambda_1 \\ \Delta \lambda_2 \\ \Delta y_1 \\ \Delta y_2 \\ \Delta y_3 \\ \Delta T \end{bmatrix} = - \begin{bmatrix} f_X(X,U) + T_X + \lambda_1^T + y_1^T \alpha_X(X) + \\ y_2^T \beta_X(X,U) + y_3^T \gamma_X(X,U,Z) \\ f_U(X,U) + T_U + y_2^T \beta_U(X,U) + y_3^T \gamma_U(X,U,Z) \\ T_Z + \lambda_2^T N + y_3^T \gamma_Z(X,U,Z) \\ T_{S_X} + \lambda_1^T \\ T_{S_U} + \lambda_2^T \\ X + S_X - X^{UB} \\ MU + NZ + S_U - b \\ \alpha(X) \\ \beta(X,U) \\ \gamma(X,U,Z) \\ T \cdot \begin{bmatrix} X \\ U \\ Z \\ S_X \\ S_U \end{bmatrix} - \mu e \end{bmatrix} \quad (41)$$

where H is the following Jacobian matrix:

$$H = \begin{bmatrix} H_{1,1} & 0 & 0 & 0 & 0 & I & 0 & H_{1,8} & H_{1,9} & H_{1,10} & E_1 \\ 0 & H_{2,2} & 0 & 0 & 0 & 0 & H_{2,7} & 0 & H_{2,9} & H_{2,10} & E_2 \\ 0 & 0 & 0 & 0 & 0 & 0 & H_{3,7} & 0 & 0 & H_{3,10} & E_3 \\ 0 & 0 & 0 & 0 & 0 & I & 0 & 0 & 0 & 0 & E_4 \\ 0 & 0 & 0 & 0 & 0 & 0 & I & 0 & 0 & 0 & E_5 \\ I & 0 & 0 & I & 0 & 0 & 0 & 0 & 0 & 0 & 0 \\ 0 & H_{2,7} & H_{3,7} & 0 & I & 0 & 0 & 0 & 0 & 0 & 0 \\ H_{1,8} & 0 & 0 & 0 & 0 & 0 & 0 & 0 & 0 & 0 & 0 \\ H_{1,9} & H_{2,9} & 0 & 0 & 0 & 0 & 0 & 0 & 0 & 0 & 0 \\ H_{1,10} & H_{2,10} & H_{3,10} & 0 & 0 & 0 & 0 & 0 & 0 & 0 & 0 \\ T_1 & T_2 & T_3 & T_4 & T_5 & 0 & 0 & 0 & 0 & 0 & T_6 \end{bmatrix} \quad (42)$$

where $E_i$ is the $i^{th}$ block identity matrix where $$I = \sum_{i=1}^{5} E_i; \quad (43.1)$$

$$T_i = E_i \begin{bmatrix} \text{diag}\{T_X\} & & & & \\ & \text{diag}\{T_U\} & & & \\ & & \text{diag}\{T_Z\} & & \\ & & & \text{diag}\{T_{S_X}\} & \\ & & & & \text{diag}\{T_{S_U}\} \end{bmatrix} \quad (43.2)$$

for $i = 1, 2, 3, 4, 5$;

$$T_6 = \begin{bmatrix} \text{diag}\{X\} & & & & \\ & \text{diag}\{U\} & & & \\ & & \text{diag}\{Z\} & & \\ & & & \text{diag}\{S_X\} & \\ & & & & \text{diag}\{S_U\} \end{bmatrix}; \quad (43.3)$$

$$H_{1,1} = [V^x \mid W^x]; \quad (43.4)$$

$$H_{1,8} = [I \mid -R]^T; \quad (43.5)$$

$$R = \begin{pmatrix} [R_{11}I \ldots R_{1N_1}I] & 0 & \ldots & 0 \\ 0 & [R_{21}I \ldots R_{2N_2}I] & \ldots & 0 \\ 0 & \vdots & \ddots & \vdots \\ 0 & \ldots & 0 & [R_{N_1 1}I \ldots R_{N_1 N_1}I] \end{pmatrix};$$ (43.6)

$$H_{1,9} = [0 \mid I]^T;$$ (43.7)

$$H_{1,10} = F^T;$$ (43.8)

$$H_{2,2} = [V^U \mid W^U];$$ (43.9)

$$H_{2,7} = M^T;$$ (43.10)

$$H_{2,9} = [A \mid B]^T,$$ (43.11)

where $A_{ij}$, $B_{ij}$ that correspond to the branch (i,j) are defined as $$A_{ij} = [0, \ldots A_{ij}^1, \ldots A_{ij}^{K_i}, 0, \ldots B_{ij}^1, \ldots B_{ij}^{K_{ji}}, 0, \ldots],$$ (43.12)

$$B_{ij} = [0, \ldots C_{ij}^1, \ldots C_{ij}^{K_{ij}}, 0, \ldots D_{ij}^1, \ldots D_{ij}^{K_{ji}}, 0, \ldots],$$ (43.13)

$$H_{2,10} = N^T;$$ (43.14)

$$H_{3,10} = H^T.$$ (43.15)

By defining $$\begin{bmatrix} r_X \\ r_U \\ r_Z \\ r_{S_X} \\ r_{S_U} \\ r_{\lambda_1} \\ r_{\lambda_2} \\ r_{y_1} \\ r_{y_2} \\ r_{y_3} \\ r_T \end{bmatrix} = \begin{bmatrix} f_X(X, U) + T_X + \lambda_1^T + y_1^T \alpha_X(X) + \\ y_2^T \beta_X(X, U) + y_3^T \gamma_X(X, U, Z) \\ f_U(X, U) + T_U + y_2^T \beta_U(X, U) + y_3^T \gamma_U(X, U, Z) \\ T_Z + \lambda_2^T N + y_3^T \gamma_Z(X, U, Z) \\ T_{S_X} + \lambda_1^T \\ T_{S_U} + \lambda_2^T \\ X + S_X - X^{UB} \\ MU + NZ + S_U - b \\ \alpha(X) \\ \beta(X, U) \\ \gamma(X, U, Z) \\ T \cdot \begin{bmatrix} X \\ U \\ Z \\ S_X \\ S_U \end{bmatrix} - \mu e \end{bmatrix}$$ (44)

one has $$\begin{bmatrix} H_{1,1} & 0 & 0 & 0 & 0 & I & 0 & H_{1,8} & H_{1,9} & H_{1,10} & E_1 \\ 0 & H_{2,2} & 0 & 0 & 0 & 0 & H_{2,7} & 0 & H_{2,9} & H_{2,10} & E_2 \\ 0 & 0 & 0 & 0 & 0 & 0 & H_{3,7} & 0 & 0 & H_{3,10} & E_3 \\ 0 & 0 & 0 & 0 & 0 & I & 0 & 0 & 0 & 0 & E_4 \\ 0 & 0 & 0 & 0 & 0 & I & 0 & 0 & 0 & 0 & E_5 \\ I & 0 & 0 & I & 0 & 0 & 0 & 0 & 0 & 0 & 0 \\ 0 & H_{2,7} & H_{3,7} & 0 & I & 0 & 0 & 0 & 0 & 0 & 0 \\ H_{1,8} & 0 & 0 & 0 & 0 & 0 & 0 & 0 & 0 & 0 & 0 \\ H_{1,9} & H_{2,9} & 0 & 0 & 0 & 0 & 0 & 0 & 0 & 0 & 0 \\ H_{1,10} & H_{2,10} & H_{3,10} & 0 & 0 & 0 & 0 & 0 & 0 & 0 & 0 \\ T_1 & T_2 & T_3 & T_4 & T_5 & 0 & 0 & 0 & 0 & 0 & T_6 \end{bmatrix}$$ (45)

$$\begin{bmatrix} \Delta X \\ \Delta U \\ \Delta Z \\ \Delta S_X \\ \Delta S_U \\ \Delta \lambda_1 \\ \Delta \lambda_2 \\ \Delta y_1 \\ \Delta y_2 \\ \Delta y_3 \\ \Delta T \end{bmatrix} = - \begin{bmatrix} r_X \\ r_U \\ r_Z \\ r_{S_X} \\ r_{S_U} \\ r_{\lambda_1} \\ r_{\lambda_2} \\ r_{y_1} \\ r_{y_2} \\ r_{y_3} \\ r_T \end{bmatrix}.$$

Similar to EQS. (26), the dimension of the system of EQS. (45) can be very large. By decomposing $r_T$ as follows, $$r_T = \begin{bmatrix} r_{T_X} \\ r_{T_U} \\ r_{T_Z} \\ r_{T_{S_X}} \\ r_{T_{S_U}} \end{bmatrix},$$ (46)

the dimension of EQS. (45) can be reduced as follows. From the last block constraints there is:

$$\begin{bmatrix} \Delta T_X \\ \Delta T_U \\ \Delta T_Z \\ \Delta T_{S_X} \\ \Delta T_{S_U} \end{bmatrix} = \begin{bmatrix} \text{diag}^{-1}(X)(r_{T_X} - \text{diag}(T_X)\Delta X) \\ \text{diag}^{-1}(U)(r_{T_U} - \text{diag}(T_U)\Delta U) \\ \text{diag}^{-1}(Z)(r_{T_Z} - \text{diag}(T_Z)\Delta Z) \\ \text{diag}^{-1}(S_X)(r_{T_{S_X}} - \text{diag}(T_{S_X})\Delta S_X) \\ \text{diag}^{-1}(S_U)(r_{T_{S_U}} - \text{diag}(T_{S_U})\Delta S_U) \end{bmatrix}.$$ (47)

This definition for the $\Delta T$s can be substituted into the other blocks of the matrix on the left hand side of EQ. (45), which can be reorganized into primal and dual parts:

$$\begin{bmatrix} I & 0 & 0 & I & 0 & | & 0 & 0 & 0 & 0 & 0 & 0 \\ 0 & H_{2,7} & H_{3,7} & 0 & I & | & 0 & 0 & 0 & 0 & 0 & 0 \\ H_{1,8} & 0 & 0 & 0 & 0 & | & 0 & 0 & 0 & 0 & 0 & 0 \\ H_{1,9} & H_{2,9} & 0 & 0 & 0 & | & 0 & 0 & 0 & 0 & 0 & 0 \\ H_{1,10} & H_{2,10} & H_{3,10} & 0 & 0 & | & 0 & 0 & 0 & 0 & 0 & 0 \\ - & - & - & - & - & - & - & - & - & - & - & - \\ \tilde{H}_{1,1} & 0 & 0 & 0 & 0 & | & I & 0 & H_{1,8} & H_{1,9} & H_{1,10} & E_1 \\ 0 & \tilde{H}_{2,2} & 0 & 0 & 0 & | & 0 & H_{2,7} & 0 & H_{2,9} & H_{2,10} & E_2 \\ 0 & 0 & \tilde{H}_{3,3} & 0 & 0 & | & 0 & H_{3,7} & 0 & 0 & H_{3,10} & E_3 \\ 0 & 0 & 0 & \tilde{H}_{4,4} & 0 & | & I & 0 & 0 & 0 & 0 & E_4 \\ 0 & 0 & 0 & 0 & \tilde{H}_{5,5} & | & 0 & I & 0 & 0 & 0 & E_5 \end{bmatrix} \quad (48)$$

$$\begin{bmatrix} \Delta X \\ \Delta U \\ \Delta Z \\ \Delta S_X \\ \Delta S_U \\ -| \\ \Delta \lambda_1 \\ \Delta \lambda_2 \\ \Delta y_1 \\ \Delta y_2 \\ \Delta y_3 \end{bmatrix} = - \begin{bmatrix} r_{\lambda_1} \\ r_{\lambda_2} \\ r_{y_1} \\ r_{y_2} \\ r_{y_3} \\ - \\ \tilde{r}_X \\ \tilde{r}_U \\ \tilde{r}_Z \\ \tilde{r}_{S_X} \\ \tilde{r}_{S_U} \end{bmatrix}$$

where $$\begin{bmatrix} \tilde{H}_{1,1} \\ \tilde{H}_{2,2} \\ \tilde{H}_{3,3} \\ \tilde{H}_{4,4} \\ \tilde{H}_{5,5} \end{bmatrix} = \begin{bmatrix} H_{1,1} - \text{diag}^{-1}(X)\text{diag}(T_X) \\ H_{2,2} - \text{diag}^{-1}(U)\text{diag}(T_U) \\ -\text{diag}^{-1}(Z)\text{diag}(T_Z) \\ -\text{diag}^{-1}(S_X)\text{diag}(T_{S_X}) \\ -\text{diag}^{-1}(S_U)\text{diag}(T_{S_U}) \end{bmatrix}, \quad (49)$$

and $$\begin{bmatrix} \tilde{r}_X \\ \tilde{r}_U \\ \tilde{r}_Z \\ \tilde{r}_{S_X} \\ \tilde{r}_{S_U} \end{bmatrix} = \begin{bmatrix} r_X + \text{diag}^{-1}(X) r_{T_X} \\ r_U + \text{diag}^{-1}(U) r_{T_U} \\ r_Z + \text{diag}^{-1}(Z) r_{T_Z} \\ r_{S_X} + \text{diag}^{-1}(S_X) r_{S_{T_X}} \\ r_{S_U} + \text{diag}^{-1}(S_U) r_{S_{T_U}} \end{bmatrix}. \quad (50)$$

According to an embodiment of the invention, EQ. (45) can be reduced to $$\begin{bmatrix} I & 0 & 0 & I & 0 \\ 0 & H_{2,7} & H_{3,7} & 0 & I \\ H_{1,8} & 0 & 0 & 0 & 0 \\ H_{1,9} & H_{2,9} & 0 & 0 & 0 \\ H_{1,10} & H_{2,10} & H_{3,10} & 0 & 0 \end{bmatrix} \begin{bmatrix} \Delta X \\ \Delta U \\ \Delta Z \\ \Delta S_X \\ \Delta S_U \end{bmatrix} = - \begin{bmatrix} r_{\lambda_1} \\ r_{\lambda_2} \\ r_{y_1} \\ r_{y_2} \\ r_{y_3} \end{bmatrix} \quad (51)$$

and $$\begin{bmatrix} \tilde{H}_{1,1} & 0 & 0 & 0 & 0 \\ 0 & \tilde{H}_{2,2} & 0 & 0 & 0 \\ 0 & 0 & \tilde{H}_{3,3} & 0 & 0 \\ 0 & 0 & 0 & \tilde{H}_{4,4} & 0 \\ 0 & 0 & 0 & 0 & \tilde{H}_{5,5} \end{bmatrix} \quad (52)$$

$$\begin{bmatrix} \Delta X \\ \Delta U \\ \Delta Z \\ \Delta S_X \\ \Delta S_U \end{bmatrix} + \begin{bmatrix} I & 0 & H_{1,8} & H_{1,9} & H_{1,10} & E_1 \\ 0 & H_{2,7} & 0 & H_{2,9} & H_{2,10} & E_2 \\ 0 & H_{3,7} & 0 & 0 & H_{3,10} & E_3 \\ I & 0 & 0 & 0 & 0 & E_4 \\ 0 & I & 0 & 0 & 0 & E_5 \end{bmatrix} \begin{bmatrix} \Delta \lambda_1 \\ \Delta \lambda_2 \\ \Delta y_1 \\ \Delta y_2 \\ \Delta y_3 \end{bmatrix} = \begin{bmatrix} \tilde{r}_X \\ \tilde{r}_U \\ \tilde{r}_Z \\ \tilde{r}_{S_X} \\ \tilde{r}_{S_U} \end{bmatrix}$$

EQS. (51) and (52) can be solved similarly to EQS. (30) and (31) above, by expanding the block components in the matrices of EQS. (51) and (52) using their definitions above, and carrying out a series of substitutions similar to that of EQ. (34).

Heuristic Block-Wise Newton Method

It can be seen that a system according to an embodiment of the invention is highly structural in the way that all constraints can be grouped by buses and branches. Without loss of generality, a minimal AC OPF model according to an embodiment of the invention will be considered as an example, and the same heuristic can be applied to a more general discrete AC OPF model according to an embodiment of the invention.

For a minimal AC OPF model according to an embodiment of the invention, the following non-linear system will be solved:

$$\tilde{L} = \begin{bmatrix} \nabla f(X) - \mu/X - Y - y_1^T \nabla o(x_{ij}, x_i) - y_2^T \nabla v(X) \\ -\mu/S - Y \\ -(X + S - X^{UB}) \\ -o(x_{ij}, x_i) \\ -v(X) \end{bmatrix} = 0. \quad (53)$$

According to an embodiment of the invention, the vector $\tilde{L}$ can be re-organized and rewritten as follows:

$$\tilde{L} = \begin{bmatrix} \{L^i\} \\ \{L^{ij}\} \end{bmatrix}, \quad (54)$$

where each $L^i$ denotes the constraints of bus i, thus is a function of $x_i$ and $\{x_{ik}\}$. Similarly each $L^{ij}$ denotes the constraints of branch (i, j), which is a function of $x_i$, $x_j$, $u_i$, $u_j$, $u_{ij}$, and $u_{ji}$. Therefore, according to an embodiment of the invention, the system can be decomposed by different buses and branches. More specifically, instead of directly applying Newton method to $\tilde{L}$, it can be used for every bus $L^i$ and branch $L^{ij}$:

$$H^i \cdot \begin{bmatrix} \Delta X^i \\ \Delta S^i \\ \Delta Y^i \\ \Delta y_1^i \\ \Delta y_2^i \end{bmatrix} = -L^i; \quad H^{ij} \cdot \begin{bmatrix} \Delta X^{ij} \\ \Delta S^{ij} \\ \Delta Y^{ij} \\ \Delta y_1^{ij} \\ \Delta y_2^{ij} \end{bmatrix} = -L^{ij}, \quad (55)$$

where the Jacobian matrices $H^i$ and $H^{ij}$ can be obtained by the above techniques. Moreover, cutting plane methods can be used to solve these block-wise Newton's equations since each cutting plane is a function of either $L^i$ or $L^{ij}$.

One issue with respect to this block-wise Newton method according to an embodiment of the invention is its convergence because some variables will be updated more than once in each iteration. For instance, there will be different $\Delta u_i$ when solving $L^{ij}$ and $L^{ik}$. A straightforward technique would be to add $\Delta u$, whenever there is an update for it. However, no theoretic proof will guarantee the convergence in this case.

Interior Point Method Algorithm

Figure 3:
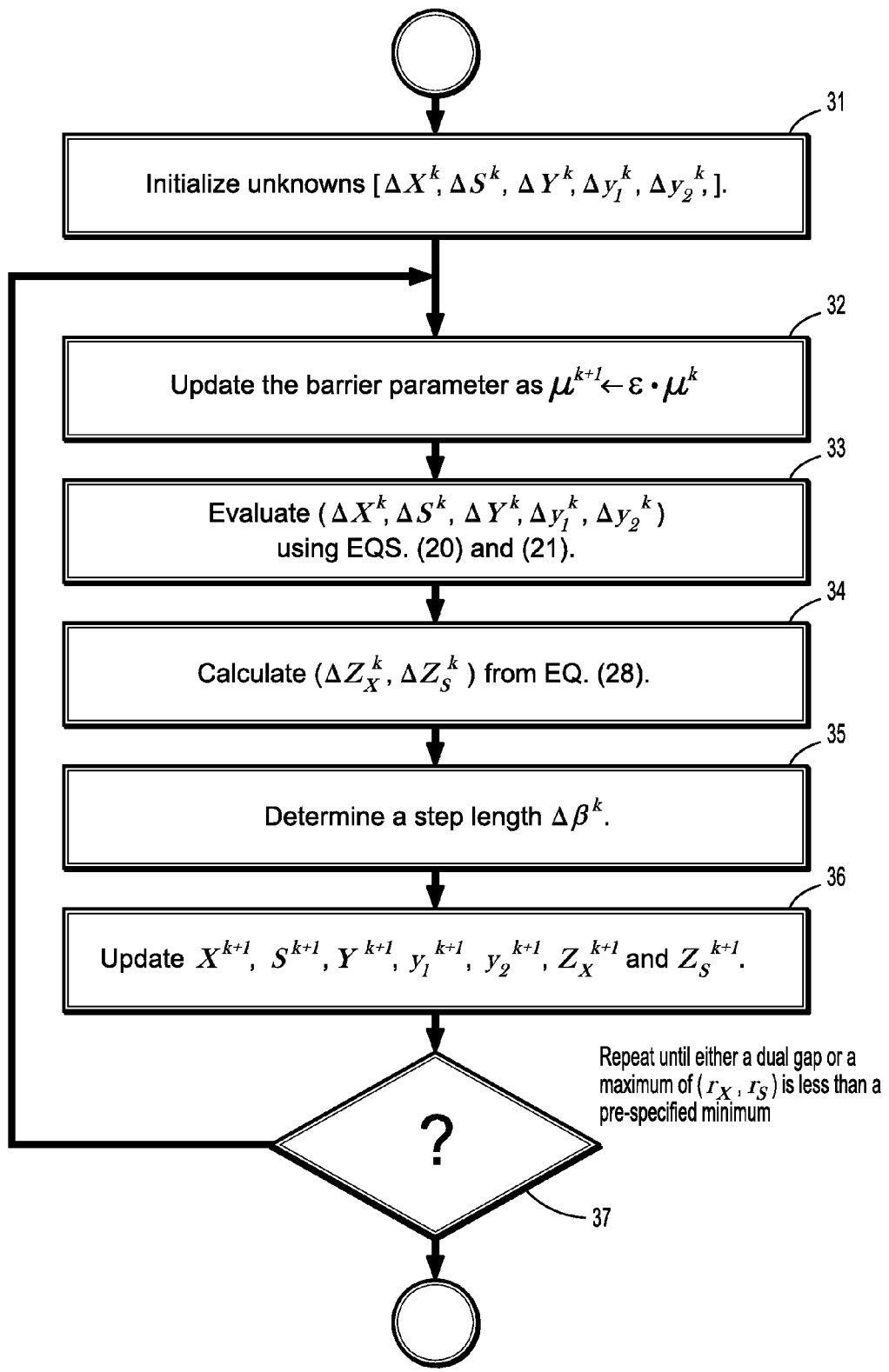
FIG. 3 is a flow chart of an iterative method for solving an optimal power flow model of a smart power grid, according to an embodiment of the invention.

Based on the above linear system, given a tolerance $\epsilon > 0$, barrier parameter $\mu = \mu^0$, and iteration counter k=1, an interior point algorithm according to an embodiment of the invention can be designed as follows, with reference to the flowchart of FIG. 3.

Begin Initialize variables $X^k = X^0$, $S^k = S^0$, ... (Step 31)
Repeat
Update $\mu^{k+1} \leftarrow \epsilon \cdot \mu^k$, $\epsilon \in (0.1, \ldots, 0.9)$; (Step 32)
Evaluate $(\Delta X^k, \Delta S^k, \Delta Y^k, \Delta y_1^k, \Delta y_2^k)$ using EQS. (30) and (31); (Step 33)
Calculate $(\Delta Z_X^k, \Delta Z_S^k)$ using EQS. (27); (Step 34)
Find a step length $\Delta \beta^k$ by a line search; (Step 35)
Update: (Step 36)

$X^{k+1} \leftarrow X^k + \Delta \beta^k \Delta X^k$, $S^{k+1} \leftarrow S^k + \Delta \beta^k \Delta S^k$, $Y^{k+1} \leftarrow Y^k + \Delta \beta^k \Delta Y^k$, $y_1^{k+1} \leftarrow y_1^k + \Delta \beta^k \Delta y_1^k$, $y_2^{k+1} \leftarrow y_2^k + \Delta \beta^k \Delta y_2^k$, $Z_X^{k+1} \leftarrow Z_X^k + \Delta \beta^k \Delta Z_X^k$, $Z_S^{k+1} \leftarrow Z_S^k + \Delta \beta^k \Delta Z_S^k$, Until Stop conditions are satisfied (Step 37).
The initial values of the variables depend upon the situation. To measure optimality, a dual gap according to an embodiment of the invention is defined as:

$$\text{gap} = X^{UB^T} Y + b_x^T y_1 + b_v^T y_2 - \tfrac{1}{2} X^T V X - f(x, u). \quad (56)$$

A stop condition according to an embodiment of the invention can be one of the following:

$$\text{gap} \le \epsilon, \text{ or} \quad (57)$$

$$\max\{r_X, r_S\} \le \epsilon. \quad (58)$$

The line search of Step 15 tries to find the suitable step size. Two methods which could be considered are the Trust-region method and the Filter line-search.

A trust region method has a region around the current search point, where the quadratic model $q_k(\beta^k) = f(X_k) + \nabla f(X_k)^T \beta^k + \tfrac{1}{2} \beta_k^T B_k \beta^k$ for "local minimization" is "trusted" to be correct and steps are chosen to stay within this region. The size of the region is modified during the search, based on how well the model agrees with actual function evaluations. Once a step $\beta^k$ is chosen, the function is evaluated at the new point, and the actual function value is checked against the value predicted by the quadratic model. What is actually computed is the ratio of actual to predicted reduction:

$$\beta^k = \frac{f(X_k) - f(X_k + \beta^k)}{q_k(0) - q_k(\beta^k)} = \frac{\text{actual reduction of } f}{\text{predicted model reduction of } f}.$$

If $\beta^k$ is close to 1, then the quadratic model is quite a good predictor and the region can be increased in size. On the other hand, if $\beta^k$ is too small, the region is decreased in size. When k is below a threshold $\eta$, the step is rejected and recomputed.

A filter line-search interprets EQS. (19) and (14.1)-(14.5) as a bi-objective optimization program with twin goals of minimizing the objective function $L_\mu(X, S)$ and the constraint violation $\theta = \|c(X)\|$. Following this paradigm, a trial point $X^k(\beta^k) = X^k + \beta^k \Delta X^k$ may be acceptable, if it leads to sufficient progress toward either objective compared to the current iterate, i.e., if $$\theta(X^k(\beta^k)) \leq (1-\gamma_\theta)\theta(X^k), \text{ or}$$

$$L_\mu(X^k(\beta^k), S^k(\beta^k)) \leq L_\mu(X^k, S^k) - \gamma_L \theta(X^k)$$

holds for fixed constant $\gamma_\theta, \gamma_L \in (0,1)$.

Extended OPF Model

An extended OPF model according to other embodiments of the invention assumes an AC-only grid with continuous-only dependent (non-control) variables x and control variables u, and that a particular bus can be connected to more than one generator or load, or both at the same time. In addition to that, no thermal capacity limits are enforced on the branch power flows. An extended OPF model according to other embodiments of the invention can be solved by the above disclosed methods for solving a discrete AC OPF model and a minimal AC OPF model according to other embodiments of the invention.

Bus dependent variables vector $x_i$ typically includes net active $x_i^P$ and reactive $x_i^Q$, and it is computed for each bus i according to EQ. (1):

$$x_i = \sum_{k=1}^{G_i} x_{i,k}^g - \sum_{k=1}^{L_i} x_{i,k}^l + \sum_{k=1}^{SH_i} x_{i,k}^{sh}, \quad (60)$$

where $G_i$, $L_i$ and $SH_i$ are the number of generators, loads and shunts placed on bus i and $x_{i,k}^g$, $x_{i,k}^l$ and $x_{i,k}^{sh}$ are the $k^{th}$ active and reactive generation, load and shunt variables at bus i, respectively. Power system models may include loads and shunts as a function of the associated node's voltage magnitudes. However, in a model according to an embodiment of the invention, load and shunt devices are assumed to operate as constant power devices. EQ. (60) may be rewritten in a vector notation as $$x = \tilde{A}\tilde{x}, \quad (61)$$

where $\tilde{A} \in \{-1,0,1\}^{N \times 2(G+L+SH)}$ indicates which generators, loads or shunts are connected to the same bus, and $\tilde{x}$ is a vector of generators, loads and shunts on the network.

Box Constraints:

Two box-constraint families may be defined that independently limit bus control vector u and dependent bus variable column vector $\tilde{x}$:

$$\tilde{x}^{LB} \leq \tilde{x} \leq \tilde{x}^{UB},$$

$$u^{LB} \leq u \leq u^{UB},$$

Bus control vector $u_i$ typically includes voltage magnitude $V_i$ (log-scaled according to an embodiment of the invention), phase angle $\theta_i$; and shunt switch position $Q_i$.

Similarly, box-constraints may be defined for branch variables that independently limit branch control vector $v_{ij}$, which typically includes transformer tap selection $t_{ij}$ and phase shift $\phi_{ij}$, and dependent branch variable vector $y_{ij}$, which typically includes net active $y_{ij}^P$ and reactive $y_{ij}^Q$ power injections, for each branch ij:

$$y^{LB} \leq y \leq y^{UB},$$

$$v^{LB} \leq v \leq v^{UB},$$

Flow Balance Set:

At every bus, a net power injection balance should be maintained between a bus and the connected branches. A branch dependent variables vector $y_{ij}$ may be defined, in which typically $y_{ij} = y_{ij}^P, y_{ij}^Q$, and the balance for each bus i may be specified as follows:

$$a_i \tilde{x} = \sum_{j=1}^{N} R_{ij} y_{ij} \quad (62)$$

where $a_i$ is $i^{th}$ row of matrix $\tilde{A}$. Note that matrix R is always highly sparse since the connection density in real-world power grids is typically 1 to 5 branches per bus.

Linearized Voltage Law:

According to an embodiment of the invention, a first order approximation of the voltage law constraints is used. A linearized version of the AC voltage law defining the relation between branch power flow vectors $y_{ij}$ and control vectors $u_i$, $u_j$, $v_{ij}$ which are linearized with respect to a given fixed point $(u_i^0, u_j^0, v_{ij}^0)$ is written as $$y_{ij} = R_{ij} \cdot (A_{ij}^0 \cdot u_i + B_{ij}^0 \cdot u_j + C_{ij}^0 \cdot v_{ij} + D_{ij}^0 \cdot v_{ji} + E_{ij}^0) \quad (63)$$

This constraint exhibits two types of sparsity: one inherited from $R_{ij}$, and the other due to dependence on only two control vectors $(u_i, u_j)$ and $(v_{ij}, v_{ji})$ instead of the whole-grid control vector $U = \lfloor (u_i)_{i=1}^N; (v_{ij})_{i,j=1}^N \rfloor$. The matrices $A_{ij}^0, B_{ij}^0, C_{ij}^0, D_{ij}^0, E_{ij}^0$ can be explicitly pre-calculated for every link (i,j) for the given point $(u_i^0, u_j^0, v_{ij}^0)$.

Objective Function:

An OPF model according to an embodiment of the invention assumes a generic convex quadratic cost function to be minimized. This function includes terms related to managing the vector $u_i$ that minimizes control adjustment costs, bus dependent variables vector $\tilde{x}_i$ that minimize generation costs, and branch dependent variables vector $y_{ij}$ that minimize transmission losses, and a penalty coefficient for the auxiliary variable $\beta$:

$$f(\tilde{x}, u, y, v) = \tfrac{1}{2}[\tilde{x}^T V^X \tilde{x} + u^T V^U u + y^T W^Y y + v^T W^V v] + S^X \tilde{x} + S^U u + T^Y y + T^V v. \quad (64)$$

Interior Point Method Solver Math for the Minimal OPF Model

A model according to an embodiment of the invention can be standardized to the following format:

$$\tfrac{1}{2}[x_1^T V^X \tilde{x}_1 + u_1^T V^U u_1 + y_1^T W^Y y_1 + v_1^T W^V v_1] + S^X \tilde{x}_1 + S^U u_1 + T^Y y_1 + T^V v_1. \quad (65)$$

Slack variables are introduced for all bound constraints:

$$\tilde{x}_{i1} + s_{xi} = \tilde{x}_{i1}^{UB} \forall\, i \qquad (66.1)$$
$$u_{i1} + s_{ui} = u_{i1}^{UB} \forall\, i$$
$$y_{ij1} + s_{yij} = y_{ij1}^{UB} \forall\, ij$$
$$v_{ij1} + s_{vij} = v_{ij1}^{UB} \forall\, ij$$

$$\tilde{\alpha}_i \tilde{x}_1 - \sum_{j=1}^{N} R_{ij} \cdot y_{ij1} = b_x \qquad (66.2)$$

$$y_{ij1} - R_{ij} \cdot (A_{ij}^0 \cdot u_{i1} + B_{ij}^0 \cdot u_{j1} + C_{ij}^0 \cdot v_{i1} + D_{ij}^0 \cdot v_{ij1}) = b_v \qquad (66.3)$$

$$\tilde{x}_1, y_1, u_1, v_1, s_{\tilde{x}}, s_u, s_y, s_v \geq 0 \qquad (66.4)$$

where $S_{\tilde{x}}$, $S_u$, $S_y$, $S_v$ are slack variables, and $$\tilde{x}_{i1} = \tilde{x}_i - \tilde{x}_i^{LB}, \qquad (67.1)$$
$$y_{ij1} = y_{ij} - y_{ij}^{LB},$$

$$\tilde{x}_{i1}^{UB} = \tilde{x}_i^{UB} - \tilde{x}_i^{LB}, \qquad (67.2)$$
$$y_{ij1}^{UB} = y_{ij}^{UB} - y_{ij}^{LB},$$
$$u_{i1} = u_i - u_i^{LB},$$
$$v_{ij1} = v_{ij} - v_{ij}^{LB},$$
$$u_{i1}^{UB} = u_i^{UB} - u_i^{LB},$$
$$v_{ij1}^{UB} = v_{ij}^{UB} - v_{ij}^{LB},$$

$$b_x = \sum_{j=1}^{N} R_{ij} \cdot y_{ij}^{LB} - \tilde{\alpha}_i \tilde{x}_i^{LB}, \qquad (67.3)$$

$$b_v = R_{ij} \cdot (E_{ij1}^0 + A_{ij}^0 \cdot u_i^{LB} + B_{ij}^0 \cdot u_j^{LB} + C_{ij}^0 \cdot v_{ij}^{LB} + D_{ij}^0 \cdot v_{ji}^{LB}) - y_{ij}^{LB} \qquad (67.4)$$

According to an embodiment of the invention, the coefficients of the objective function $f$ can be changed:

$$S_{i1}^X = S_i^X + V_i^X \tilde{x}_i^{LB}$$
$$S_{i1}^U = S_i^U + V_i^U u_j^{LB}$$
$$T_{ij1}^Y = T_{ij}^Y + W_{ij}^X \tilde{x}_i^{LB}$$
$$T_{ij1}^V = T_{ij}^V + W_{ij}^V u_j^{LB} \qquad (68)$$

Let $$v(y_{ij}, u_i, v_{ij})_{ij} = y_{ij1} - R_{ij} \cdot (A_{ij}^0 \cdot u_{i1} + B_{ij}^0 \cdot u_{j1} + C_{ij}^0 \cdot v_{ij1} + D_{ij}^0 \cdot v_{ji1}) - b_v \qquad (69)$$

and $$o(y_{ij}, \tilde{x})_i = \tilde{\alpha}_i \tilde{x}_1 - \sum_{j=1}^{N} R_{ij} \cdot y_{ij1} - b_x. \qquad (70)$$

According to an embodiment of the invention, notation can be simplified and readability can be improved by redefining the variable vector x and slack variables s so that $$x = \begin{bmatrix} \tilde{x} \\ u \\ y \\ v \end{bmatrix} \text{ and } s = \begin{bmatrix} s_{\tilde{x}} \\ s_u \\ s_y \\ s_v \end{bmatrix} \qquad (71)$$

By introducing logarithmic barrier terms, the following Lagrangian function can be derived:

$$L_u(x,s) = f(x) - \mu^T(\ln x + \ln s) - \eta^T(x+s-x^{UB}) - \lambda_1^T o(y_{ij}, \tilde{x}) - \lambda_2^T v(y_{ij}, u_i, v_{ij}). \qquad (72)$$

The Lagrange multiplier vectors $\eta$, $\lambda_1$, $\lambda_2$, are referred to as dual variables.

The KKT optimality conditions of the barrier system are:

$$\begin{bmatrix} \Delta L_X \\ \Delta L_S \\ \Delta L_\eta \\ \Delta L_{\lambda_1} \\ \Delta L_{\lambda_2} \end{bmatrix} = \begin{bmatrix} \Delta f(x) - \mu/x - \eta - \nabla_0(y_{ij1}, \tilde{x}_1)^T \lambda_1 - v(y_{ij}, u_i, v_{ij})^T \lambda_2 \\ -\mu/s - \eta \\ -(x+s-x^{UB}) \\ -o(y_{ij}, \tilde{x}_1) \\ -v(y_{ij}, u_i, v_{ij}) \end{bmatrix} = 0. \qquad (73)$$

By defining $z_x = \mu/x$ and $z_s = \mu/s$, EQ. (73) becomes equivalent to:

$$\begin{bmatrix} \nabla f(x) - z_x - \eta - \nabla_0(y_{ij1}, \tilde{x}_1)^T \lambda_1 - \nabla v(y_{ij}, u_i, v_{ij})^T \lambda_2 \\ -\eta - z_s \\ -(x+s-x^{UB}) \\ -o(y_{ij}, \tilde{x}_1) \\ -v(y_{ij}, u_i, v_{ij}) \\ z_x^T x - \mu e \\ z_s^T s - \mu e \end{bmatrix} = 0 \qquad (74)$$

Newton's method can be used to solve the above non-linear equations, which yields the following linear system of equations, where H is a Jacobian matrix:

$$H \cdot \begin{bmatrix} \Delta x \\ \Delta s \\ \Delta \eta \\ \Delta \lambda_1 \\ \Delta \lambda_2 \\ \Delta z_x \\ \Delta z_s \end{bmatrix} = - \begin{bmatrix} \nabla f(x) - z_x - \eta - \nabla_0(y_{ij1}, \tilde{x}_1)^T \lambda_1 - \nabla v(y_{ij}, u_i, v_{ij})^T \lambda_2 \\ -\eta - z_s \\ -(x+s-x^{UB}) \\ -o(y_{ij}, \tilde{x}_1) \\ -v(y_{ij}, u_i, v_{ij}) \\ z_x^T x - \mu e \\ z_s^T s - \mu e \end{bmatrix} \qquad (75)$$

Let $Z_x$, $Z_s$, X and S be the diagonal matrices of $z_x$, $z_s$, x and s, respectively. Then, the Jacobian matrix H takes the following form:

$$H = \begin{bmatrix} H_{11} & 0 & -I & H_{41}^T & H_{51}^T & -I & 0 \\ 0 & 0 & -I & 0 & 0 & 0 & -I \\ -I & -I & 0 & 0 & 0 & 0 & 0 \\ H_{41} & 0 & 0 & 0 & 0 & 0 & 0 \\ H_{51} & 0 & 0 & 0 & 0 & 0 & 0 \\ Z_x & 0 & 0 & 0 & 0 & X & 0 \\ 0 & Z_s & 0 & 0 & 0 & 0 & S \end{bmatrix} \qquad (76)$$

where $$H_{11} = \text{diag}(V^X, V^U, W^Y, W^V), \qquad (77.1)$$

$$H_{41} = [-I, 0, R, 0], \qquad (77.2)$$

-continued $$H_{51} = [0, H_{51}^u, -I, H_{51}^v], \quad (77.3)$$

$$R = \begin{pmatrix} [R_{11} \ldots R_{1N}] & 0 & \ldots & 0 \\ 0 & [R_{21} \ldots R_{2N}] & \ldots & 0 \\ \vdots & \vdots & \ddots & \vdots \\ 0 & \ldots & 0 & [R_{N1} \ldots R_{NN}] \end{pmatrix}, \quad (77.4)$$

$$(H_{51}^u)_{ij} = \begin{cases} (0 \ldots R_{ij}A_{ij}^0 \ 0 \ldots R_{ij}B_{ij}^0 \ 0 \ldots) & \text{if } i < j \\ (0 \ldots R_{ij}B_{ij}^0 \ 0 \ldots R_{ij}A_{ij}^0 \ 0 \ldots) & \text{if } i > j \\ (0 \ldots R_{ij}A_{ij}^0 + R_{ij}B_{ij}^0 \ 0 \ldots 0 \ 0 \ldots) & \text{if } i = j \end{cases} \quad (77.5)$$

$$(H_{51}^v)_{ij} = \begin{cases} (0 \ldots R_{ij}C_{ij}^0 \ 0 \ldots R_{ij}D_{ij}^0 \ 0 \ldots) & \text{if } i < j \\ (0 \ldots R_{ij}D_{ij}^0 \ 0 \ldots R_{ij}C_{ij}^0 \ 0 \ldots) & \text{if } i > j \\ (0 \ldots R_{ij}C_{ij}^0 + R_{ij}D_{ij}^0 \ 0 \ldots 0 \ 0 \ldots) & \text{if } i = j \end{cases}$$

where $(H_{51}^u)_{ij}$ or $(H_{51}^v)_{ij}$ is the row corresponding to branch (i,j). Note that all four diagonal blocks in the matrix $H_{11}$ are themselves diagonal by design.

According to an embodiment of the invention, one can define $$\begin{bmatrix} \nabla f(x) - z_x - \eta - \nabla_0(y_{ij1}, \tilde{x}_1)^T \lambda_1 - \nabla v(y_{ij}, u_i, v_{ij})^T \lambda_2 \\ -\eta - z_s \\ -(x + s - x^{UB}) \\ -o(y_{ij}, \tilde{x}_1) \\ -v(y_{ij}, u_i, v_{ij}) \\ z_x^T x - \mu e \\ z_s^T s - \mu e \end{bmatrix} = \begin{bmatrix} r_x \\ r_s \\ r_\eta \\ r_{\lambda_1} \\ r_{\lambda_2} \\ r_{z_x} \\ r_{z_s} \end{bmatrix} \quad (78)$$

Then, $$\begin{bmatrix} H_{11} & 0 & -I & H_{41}^T & H_{51}^T & -I & 0 \\ 0 & 0 & -I & 0 & 0 & 0 & -I \\ -I & -I & 0 & 0 & 0 & 0 & 0 \\ H_{41} & 0 & 0 & 0 & 0 & 0 & 0 \\ H_{51} & 0 & 0 & 0 & 0 & 0 & 0 \\ Z_x & 0 & 0 & 0 & 0 & X & 0 \\ 0 & Z_s & 0 & 0 & 0 & 0 & S \end{bmatrix} \begin{bmatrix} \Delta x \\ \Delta s \\ \Delta \eta \\ \Delta \lambda_1 \\ \Delta \lambda_2 \\ \Delta z_x \\ \Delta z_s \end{bmatrix} = - \begin{bmatrix} r_x \\ r_s \\ r_\eta \\ r_{\lambda_1} \\ r_{\lambda_2} \\ r_{z_x} \\ r_{z_s} \end{bmatrix}. \quad (79)$$

EQS. (79) are analogous to EQS. (26), above, and like EQS. (26), the dimension of the system of EQS. (79) can be very large. However, a procedure according to an embodiment of the invention that uses a series of back substitutions, described below, similar to that used for solving EQS. (26), can reduce the dimensionality of the system so that the equations require much less computational time to solve.

According to an embodiment of the invention, the above system of Newton equations can be solved by reducing the dimension as follows. From the last two equation there is:

$$\Delta z_X = X^{-1}(-r_{z_X} - Z_X \Delta x) \quad (80)$$

$$\Delta z_S = S^{-1}(-r_{z_S} - Z_S \Delta s) \quad (81)$$

EQS. (80) and (81) can be substituted back into the other equations, which can be re-organized into primal and dual parts as follows:

$$\begin{bmatrix} H_{41} & 0 & | & 0 & 0 & 0 \\ H_{51} & 0 & | & 0 & 0 & 0 \\ -I & -I & | & 0 & 0 & 0 \\ - & - & - & - & - & - \\ H_{11} + X^{-1}Z_x & 0 & | & -I & H_{41}^T & H_{51}^T \\ 0 & S^{-1}Z_s & | & -I & 0 & 0 \end{bmatrix} \begin{bmatrix} \Delta x \\ \Delta s \\ - \\ \Delta \eta \\ \Delta \lambda_1 \\ \Delta \lambda_2 \end{bmatrix} = \begin{bmatrix} -r_{\lambda_1} \\ -r_{\lambda_2} \\ -r_\eta \\ - \\ -r_x - X^{-1}r_{z_x} \\ -r_s - S^{-1}r_{z_s} \end{bmatrix} \quad (82)$$

According to an embodiment of the invention, define:

$$\tilde{H}_{11} = H_{11} + X^{-1}Z_x \quad (83.1)$$
$$\tilde{H}_{22} = S^{-1}Z_s$$

$$\tilde{r}_x = r_x + X^{-1}r_{z_x} \quad (83.2)$$
$$\tilde{r}_s = r_s + S^{-1}r_{z_s}$$

$$\Delta x = \begin{bmatrix} \{\Delta \tilde{x}\} \\ \{\Delta y\} \\ \{\Delta u\} \\ \{\Delta v\} \end{bmatrix} \quad (83.3)$$

$$\Delta \lambda_1 = \{\Delta \lambda_1^{\tilde{x}}\} \quad (83.4)$$
$$\Delta \lambda_2 = \{\Delta \lambda_2^y\}$$

Therefore, according to an embodiment of the invention, one has:

$$\begin{bmatrix} H_{41} & 0 \\ H_{51} & 0 \\ -I & -I \end{bmatrix} \begin{bmatrix} \Delta x \\ \Delta s \end{bmatrix} = \begin{bmatrix} -r_{\lambda_1} \\ -r_{\lambda_2} \\ -r_\eta \end{bmatrix}, \quad (84)$$

and $$\begin{bmatrix} \tilde{H}_{11} & 0 \\ 0 & \tilde{H}_{22} \end{bmatrix} \begin{bmatrix} \Delta x \\ \Delta s \end{bmatrix} + \begin{bmatrix} -I & H_{41}^T & H_{51}^T \\ -I & 0 & 0 \end{bmatrix} \begin{bmatrix} \Delta \eta \\ \Delta \lambda_1 \\ \Delta \lambda_2 \end{bmatrix} = \begin{bmatrix} -\tilde{r}_x \\ -\tilde{r}_s \end{bmatrix}. \quad (85)$$

Back Substitution Solution Series for Reduced Newton System

More specifically, similar to the solution of EQS. (30) and (31), above, EQS. (84) and (85) can be expanded using the definitions of EQS. (83.1)-(83.4) and the model definitions of EQS. (67.1)-(67.4), (68)-(71), and (77.1)-(77.5). Thus, EQ. (84) has the following expanded form for each bus i and branch (i, j):

$$\tilde{a}_i \Delta \tilde{x}_1 - \sum_j R_{ij} \Delta y_{ij1} = (r_{\lambda_1})_i \quad (86)$$

$$\Delta y_{ij1} - R_{ij}(A_{ij}^0 \Delta u_{i1} + B_{ij}^0 \Delta u_{j1} + C_{ij}^0 \Delta v_{ij1} + D_{ij}^0 \Delta v_{ji1}) = (r_{\lambda_2})_{ij}$$

$$\Delta x + \Delta s = r_\eta$$

Similarly, EQ. (85) has the following expanded form:

$$\Delta \eta - \Delta \lambda_1 = -\tilde{r}_{\beta 1} \quad (87.1)$$

$$\tilde{V}^x \Delta \tilde{x}_1 - \Delta \eta - \tilde{A}^T \Delta \lambda_1 = -\tilde{r}_{\tilde{x}_1}$$

-continued $$\tilde{W}^Y \Delta y_1 - \Delta \eta + R\Delta \lambda_1 - \Delta \lambda_2 = -\tilde{r}_{y_1} \quad (87.2)$$

$$\tilde{H}_{22}\Delta s - \Delta \eta = -\tilde{r}_s$$

and $$\tilde{V}_i^U \Delta u_{i1} - \Delta \eta_i + \sum_j R_{ij} A_{ij}^T \Delta \lambda_2^{y_{ji1}} + \sum_j R_{ji} B_{ji}^T \Delta \lambda_2^{y_{ji1}} = -(\tilde{r}_{u_1})_i \quad (87.3)$$

$$\tilde{W}_{ij}^V \Delta v_{ij1} - \Delta \eta_{ij} + R_{ij} C_{ij}^T \Delta \lambda_2^{y_{ji1}} + R_{ji} D_{ji}^T \Delta \lambda_2^{v_{ji1}} = -(\tilde{r}_{v_1})_{ij}$$

Suppose there is a candidate Newton step solution for the control variables $\Delta U = [\{\Delta u_{i1}\}, \{\Delta v_{ij1}\}]^T$. Then, one can solve for all the other variables directly through EQS. (86) and (87.1)-(87.2) forming a back substitution series of direct linear elimination:

$$\{\Delta u_1\}, \{\Delta v_1\} \rightarrow \{\Delta y_1\} \rightarrow \{\Delta \tilde{x}_1\} \rightarrow \Delta s \rightarrow \Delta \eta \rightarrow \Delta \lambda_1 \rightarrow \Delta \lambda_2 \quad (88)$$

Then, this back substitution series rule of EQ. (88) can be used to define a linear operator $L:\Delta U \rightarrow \{\Delta y_1, \Delta \tilde{x}_1, \Delta S, \Delta \eta, \Delta \lambda_1, \Delta \lambda_2\}$ defined over the span of $\Delta U = [\{\Delta u_{i1}\}, \{\Delta v_{ij1}\}]^T$. This operator can be substituted back into the linear system of EQS. (87.3) which then becomes a system of joint linear equations for the $\Delta U$ only. This system is typically full-rank, well-defined and its size is a few orders of magnitude smaller than the reduced Newton system of EQS. (85). In the simplest case of $\{\Delta v_{ij1}\}=0$, this system is N by N and relatively sparse (density factor ~0.1%) since the non-zero entries for any row i are given by the set of "double-neighbor" nodes $S_2(i) = \{j: \exists k$ s.t. $R_{jk}=1, R_{k1}=1\}$. This system is best solved via indirect or iterative methods, such as the Preconditioned Conjugate Method, since computing the full matrix form of the linear operator L is too costly for massive-scale problems.

System Implementation

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 4:
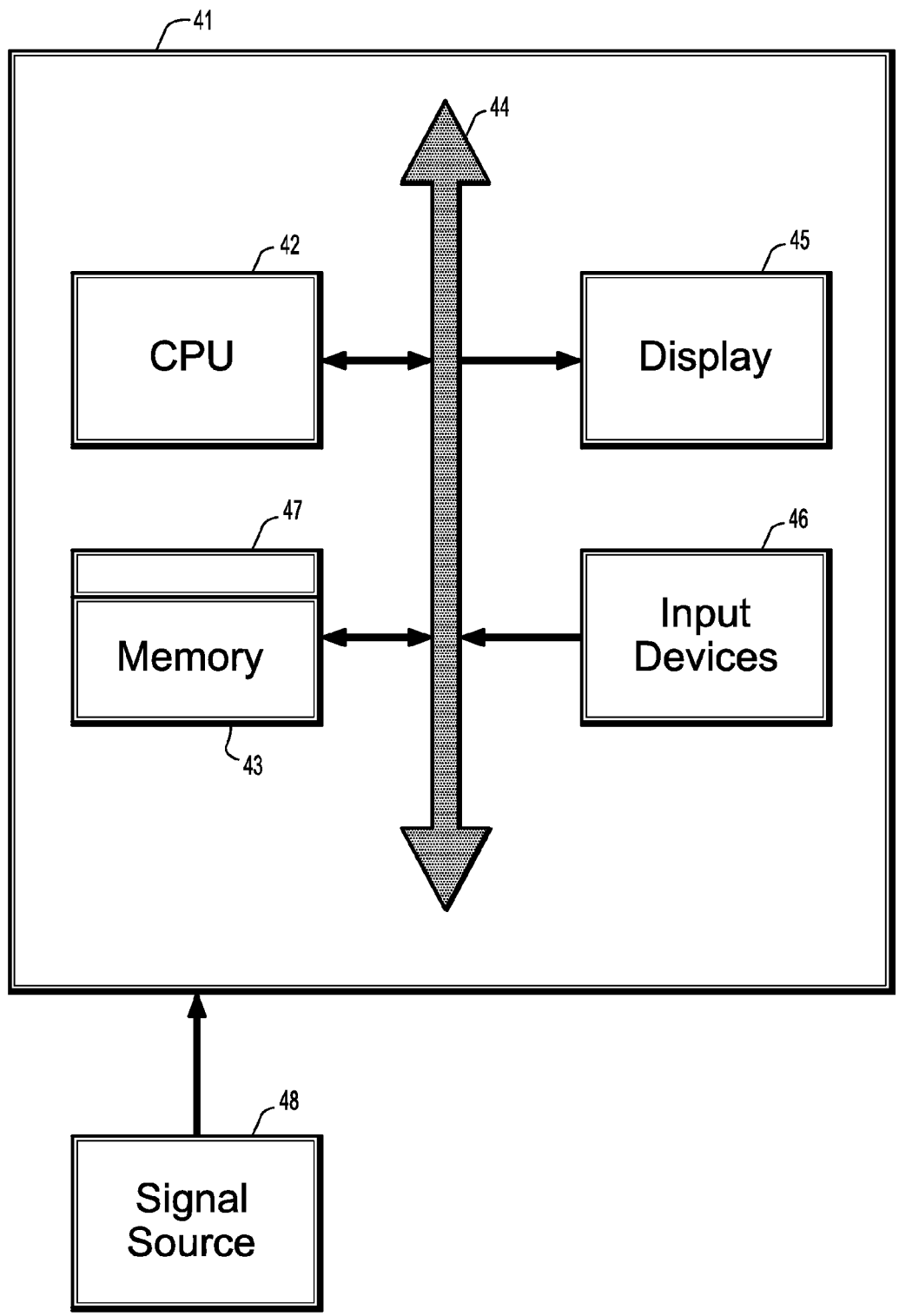
FIG. 4 is a block diagram of an exemplary computer system for implementing an interior point method for solving an optimal power flow model of a smart power grid, according to an embodiment of the invention.

FIG. 4 is a block diagram of an exemplary computer system for implementing an interior point method solution for an optimal power flow model of a smart power grid according to an embodiment of the invention. Referring now to FIG. 4, a computer system 41 for implementing the present invention can comprise, inter alia, a central processing unit (CPU) 42, a memory 43 and an input/output (I/O) interface 44. The computer system 41 is generally coupled through the I/O interface 44 to a display 45 and various input devices 46 such as a mouse and a keyboard. The support circuits can include circuits such as cache, power supplies, clock circuits, and a communication bus. The memory 43 can include random access memory (RAM), read only memory (ROM), disk drive, tape drive, etc., or a combinations thereof. The present invention can be implemented as a routine 47 that is stored in memory 43 and executed by the CPU 42 to process the signal from the signal source 48. As such, the computer system 41 is a general purpose computer system that becomes a specific purpose computer system when executing the routine 47 of the present invention.

The computer system 41 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present disclosure provided herein, one of ordinary skill in the related art will be able to contemplate these and similar implementations or configurations of the present invention.

While embodiments of the present invention has been described in detail with reference to exemplary embodiments, those skilled in the art will appreciate that various modifications and substitutions can be made thereto without departing from the spirit and scope of the disclosure as set forth in the appended claims.

What is claimed is:

1. A method for approximating an optimal power flow of a smart electric power grid, comprising the steps of:

providing a cost function that models a smart electric power grid having N buses $i \in [1,N]$ connected by branches $i,j \in [1,N] \times [1, N]$ with connection matrix $$R_{ij} = \begin{cases} 1, & \exists \text{ branch } i, j, \\ 0, & \text{otherwise,} \end{cases}$$

in terms of bus control vector $u_i$ that include voltage magnitudes $V_i$, phase angles $\theta_i$, and shunt switch positions $Q_{1i}$, bus dependent variables vector $x_i$ that include net active $x_i^P$ and reactive $x_i^Q$ power injection, wherein superscripts P and Q respectively refer to the net active power injection and the reactive power injection, branch control vector $u_{ij}$, that includes transformer tap selections $t_{ij}$ and phase shifts $\phi_{ij}$, and dependent branch variable vector $x_{ij}$, that includes net active $x_{ij}^P$ and reactive $x_{ij}^Q$ power injections, constraining the bus and branch control vectors, and the bus and branch dependent variables vectors based on physical and operational requirements and actual measurements;

deriving a set of linear equations that minimize said cost function subject to the constraints, from an expression of an extremum of said cost function with respect to all arguments;

reducing a dimension of the linear equations by solving for a subset of the linear equations;

re-organizing the reduced dimension linear equations into primal and dual parts; and decomposing the re-organized reduced dimensional linear equations into two systems of block matrix equations, wherein a solution of said two systems of block matrix equations yields conditions for a lowest cost per kilowatthour delivered through said smart electric power grid, wherein the steps of reducing a dimension of the linear equations, re-organizing the reduced dimension linear equations, and decomposing the re-organized reduced dimensional linear equations into two systems of block matrix equations are performed by a computer processor.

2. The method of claim 1, wherein said cost function is $$f(x,u) = \sum_{i=1}^{N} \left[\frac{1}{2} x_i^T V_i^X x_i + \frac{1}{2} u_i^T V_i^U u_i + S_i^X x_i + S_i^U u_i\right] +$$

$$\sum_{i,j=1}^{N} R_{ij} \cdot \left[\frac{1}{2} x_{ij}^T W_{ij}^X x_{ij} + \frac{1}{2} u_{ij}^T W_{ij}^U u_{ij} + T_{ij}^X x_{ij} + T_{ij}^U u_{ij}\right],$$

wherein bus control vector $u_i$ includes voltage magnitudes $V_i$, phase angles $\theta_i$, and shunt switch positions $Q_{1i}$, bus dependent variables vector $x_i$ includes net active $x_i^P$ and reactive $x_i^Q$ power injection, branch control vector $u_{ij}$ includes transformer tap selections $t_{ij}$ and phase shifts $\phi_{ij}$, and dependent branch variable vector $x_{ij}$ includes net active $X_{ij}^P$ and reactive $x_{ij}^Q$ power injections, and connection matrix $$R_{ij} = \begin{cases} 1, & \exists (i,j), \\ 0, & o/w, \end{cases}$$

wherein $$x_i = \sum_{j=1}^{N} R_{ij} \cdot x_{ij},$$

wherein $V^X$ is a Hessian of the objective function with respect to $x_i$, $V^U$ is a Hessian of the objective function with respect to $u_i$, $S^X$ is a gradient of the objective function with respect to $x_i$, $S^U$ is a gradient of the objective function with respect to $u_i$, $W^X$ is a Hessian of the objective function with respect to $x_{ij}$, $W^U$ is a Hessian of the objective function with respect to $u_{ij}$, $T^X$ is a gradient of the objective function with respect to $x_{ij}$, and $T^U$ is a gradient of the objective function with respect to $u_{ij}$, subject to the constraints $$x_i^{LB} \le x_i \le x_i^{UB}, \; x_{ij}^{LB} \le x_{ij} \le x_{ij}^{UB},$$

$$u_i^{LB} \le u_i \le u_i^{UB}, \; u_{ij}^{LB} \le u_{ij} \le u_{ij}^{UB},$$

wherein superscripts LB and UB respectively refer to a lower bound and an upper bound, and satisfying a voltage law $x_{ij} = R_{ij} \cdot (A_{ij}^0 u_i + B_{ij}^0 u_j + C_{ij}^0 u_{ij} + D_{ij}^0 u_{ji} + E_{ij}^0)$, wherein the matrices $A_{ij}^0, B_{ij}^0, C_{ij}^0, D_{ij}^0, E_{ij}^0$ can be explicitly pre-calculated for every link $(i,j)$ for a given anchor point $(u_i^0, u_j^0, u_{ij}^0)$.

3. The method of claim 2, wherein said linear equations that minimize said cost function are:

$$\begin{bmatrix} H_{11} & 0 & -I & H_{41}^T & H_{51}^T & -I & 0 \\ 0 & 0 & -I & 0 & 0 & 0 & -I \\ -I & -I & 0 & 0 & 0 & 0 & 0 \\ H_{41} & 0 & 0 & 0 & 0 & 0 & 0 \\ H_{51} & 0 & 0 & 0 & 0 & 0 & 0 \\ \mathrm{diag}(Z_x) & 0 & 0 & 0 & 0 & \mathrm{diag}(X) & 0 \\ 0 & \mathrm{diag}(Z_s) & 0 & 0 & 0 & 0 & \mathrm{diag}(S) \end{bmatrix} \cdot \begin{bmatrix} \Delta X \\ \Delta S \\ \Delta Y \\ \Delta y_1 \\ \Delta y_2 \\ \Delta Z_x \\ \Delta Z_s \end{bmatrix} =$$

$$-\begin{bmatrix} \nabla f(X) - Z_x - Y - y_1^T \nabla o(x_{ij}, x_i) - y_2^T \nabla v(X) \\ -Y - Z_s \\ -(X + S - X^{UB}) \\ -o(x_{ij}, x_i) \\ -v(X) \\ Z_x \cdot X - \mu e \\ Z_s \cdot S - \mu e \end{bmatrix},$$

wherein $[\Delta X, \Delta S, \Delta Y, \Delta y_1, \Delta y_2, \Delta Z_x, \Delta Z_s]$ are unknowns, I represents an identity matrix, $$H_{11} = \mathrm{diag}(V^x, W^x, V^u, W^U),$$

$$H_{41} = [-I, R, 0, 0],$$

$$R = \begin{pmatrix} [R_{11}I \; \ldots \; R_{1N_1}I] & 0 & \ldots & 0 \\ 0 & [R_{21}I \; \ldots \; R_{2N_2}I] & \ldots & 0 \\ 0 & \vdots & \ddots & \vdots \\ 0 & \ldots & 0 & [R_{N_11}I \; \ldots \; R_{N_1N_1}I] \end{pmatrix},$$

a row of branch $(i,j)$ of $H_{51}$ is $$(H_{51})_{ij} = [0, -I, \ldots R_{ij}A_{ij}^0, \ldots R_{ij}B_{ij}^0, \ldots R_{ij}C_{ij}^0, \ldots R_{ij}D_{ij}^0, \ldots 0],$$

$$X = (\{x_{i1}\}, \{x_{ij1}\}, \{u_{i1}\}, \{u_{ij1}\})^T,$$

slack variables $S = (\{s_{xi}\}, \{s_{xij}\}, \{s_{ui}\}, \{s_{uij}\})^T,$ $$o(x_{ij}, x_i) = x_{i1} - \sum_{j=1}^{N} R_{ij} \cdot x_{ij1} - b_x,$$

$$v(X) = x_{ij1} - R_{ij} \cdot (A_{ij}^0 \cdot u_{i1} + B_{ij}^0 \cdot u_{j1} + C_{ij}^0 \cdot u_{ij1} + D_{ij}^0 \cdot u_{ji1}) - b_v,$$

$Y$, $y_1$, and $y_2$ are dual variables, and $Z_x = \mu/X$, $Z_s = \mu/S$ wherein $\mu$ is a barrier parameter.

4. The method of claim 3, wherein reducing a dimension of the linear equations further comprises solving for $$\Delta Z_X = \mathrm{diag}(X)^{-1}(-r_{Z_X} - \mathrm{diag}(Z_X)\Delta X),$$

$$\Delta Z_S = \mathrm{diag}(S)^{-1}(-r_{Z_S} - \mathrm{diag}(Z_S)\Delta S),$$

wherein $r_{Z_X} = Z_X \cdot X - \mu e$, $r_{Z_S} = Z_S \cdot S - \mu e$.

5. The method of claim 4, wherein the reduced dimension linear equations re-organized into primal and dual parts are $$\begin{bmatrix} H_{41} & 0 & | & 0 & 0 & 0 \\ H_{51} & 0 & | & 0 & 0 & 0 \\ -I & -I & | & 0 & 0 & 0 \\ - & - & | & - & - & - \\ H_{11} + \mathrm{diag}(X)^{-1}\mathrm{diag}(Z_x) & 0 & | & -I & H_{41}^T & H_{51}^T \\ 0 & \mathrm{diag}(S)^{-1}\mathrm{diag}(Z_s) & | & -I & 0 & 0 \end{bmatrix} \begin{bmatrix} \Delta X \\ \Delta S \\ - \\ \Delta Y \\ \Delta y_1 \\ \Delta y_2 \end{bmatrix} =$$

-continued $$\begin{bmatrix} -r_{y_1} \\ -r_{y_2} \\ -r_Y \\ - \\ -r_X - \text{diag}(X)^{-1}rZ_x \\ -r_S - \text{diag}(S)^{-1}rZ_s \end{bmatrix},$$

wherein $$\begin{bmatrix} r_X \\ r_S \\ r_Y \\ r_{y_1} \\ r_{y_2} \end{bmatrix} = \begin{bmatrix} \nabla f(X) - Z_x - Y - y_1^T \nabla o(x_{ij}, x_i) - y_2^T \nabla v(X) \\ -Y - Z_s \\ -(X + S - X^{UB}) \\ -o(x_{ij}, x_i) \\ -v(X) \end{bmatrix}.$$

6. The method of claim 5, wherein the two systems of block matrix equations are $$\begin{bmatrix} H_{41} & 0 \\ H_{51} & 0 \\ -I & -I \end{bmatrix} \begin{bmatrix} \Delta X \\ \Delta S \end{bmatrix} = \begin{bmatrix} -r_{y_1} \\ -r_{y_2} \\ -r_Y \end{bmatrix},$$

and $$\begin{bmatrix} \tilde{H}_{11} & 0 \\ 0 & \tilde{H}_{22} \end{bmatrix} \begin{bmatrix} \Delta X \\ \Delta S \end{bmatrix} + \begin{bmatrix} -I & H_{41}^T & H_{51}^T \\ -I & 0 & 0 \end{bmatrix} \begin{bmatrix} \Delta Y \\ \Delta y_1 \\ \Delta y_2 \end{bmatrix} = \begin{bmatrix} -\tilde{r}_X \\ -\tilde{r}_S \end{bmatrix},$$

wherein $\tilde{H}_{11} = H_{11} + \text{diag}(X)^{-1}\text{diag}(Z_X),$ $\tilde{H}_{22} = \text{diag}(S)^{-1}\text{diag}(Z_S),$ $\tilde{r}_X = r_X + \text{diag}(X)^{-1}r_{Z_X},$ $\tilde{r}_S = r_S + \text{diag}(S)^{-1}r_{Z_S},$ $$\Delta X = \begin{bmatrix} \{\Delta x_i\} \\ \{\Delta x_{ij}\} \\ \{\Delta u_i\} \\ \{\Delta u_{ij}\} \end{bmatrix},$$

$\Delta y_1 = \{\Delta y_1^{x_i}\},$ $\Delta y_2 = \{\Delta y_2^{x_{ij}}\}.$

7. The method of claim 6, wherein the first block matrix equation is expanded for each bus i and branch(i, j) as follows:

$\Delta x_i - \sum_j R_{ij}\Delta x_{ij} = r_{y_1}^{x_i}$ $\Delta x_{ij} - R_{ij}(A_{ij}\Delta u_i + B_{ij}\Delta u_j + C_{ij}\Delta u_{ij} + D_{ij}\Delta u_{ji}) = r_{y_2}^{x_{ij}}$ $\Delta X + \Delta S = r_Y,$ and
the second block matrix equation is expanded for each bus i and branch(i, j) as follows:

$\tilde{V}_i^X \Delta x_i - \Delta Y^{x_i} - \Delta y_1^{x_i} = -\tilde{r}_{x_i}$ $\tilde{W}_{ij}^X \Delta x_{ij} - \Delta Y^{x_{ij}} + R_{ij}\Delta y_1^{x_i} - \Delta y_2^{x_{ij}} = -\tilde{r}_{x_{ij}}$ $\tilde{V}_i^U \Delta u_i - \Delta Y^{u_i} + \sum_j R_{ij}A_{ij}^T \Delta y_2^{x_{ij}} + \sum_j R_{ji}B_{ji}^T \Delta y_2^{x_{ji}} = -\tilde{r}_{u_i}$ $\tilde{W}_{ij}^U \Delta u_{ij} - \Delta Y^{u_{ij}} + R_{ij}C_{ij}^T \Delta y_2^{x_{ij}} + R_{ji}D_{ji}^T \Delta y_2^{x_{ji}} = -\tilde{r}_{u_{ij}}$ $\tilde{H}_{22}\Delta S - \Delta Y = -\tilde{r}_S,$ and further comprising solving for the other variables in the block matrix equations in the following order:

$\{\Delta u_i\}, \{\Delta u_{ij}\} \rightarrow \{\Delta x_{ij}\} \rightarrow \{\Delta x_i\} \rightarrow \Delta S \rightarrow \Delta Y \rightarrow \Delta y_1 \rightarrow \Delta y_2.$ 8. The method of claim 6, further comprising:
initializing unknowns $[\Delta X^k, \Delta S^k, \Delta Y^k, \Delta y_1^k, \Delta y_2^k]$ wherein k is an iteration counter;
updating the barrier parameter as $\mu^{k+1} \leftarrow \epsilon \cdot \mu^k$, $\epsilon \in (0.1, \ldots, 0.9)$;
evaluating $(\Delta X^k, \Delta S^k, \Delta Y^k, \Delta y_1^k, \Delta y_2^k)$ using the two block matrix equations;
calculating $(\Delta Z_X^k, \Delta Z_S^k)$;
determining a step length $\Delta \beta^k$ from a line search; and
updating $X^{k+1} \leftarrow X^k + \Delta \beta^k \Delta X^k,$ $S^{k+1} \leftarrow S^k + \Delta \beta^k \Delta S^k,$ $Y^{k+1} \leftarrow Y^k + \Delta \beta^k \Delta Y^k,$ $y_1^{k+1} \leftarrow y_1^k + \Delta \beta^k \Delta y_1^k,$ $y_2^{k+1} \leftarrow y_2^k + \Delta \beta^k \Delta y_2^k,$ $Z_X^{k+1} \leftarrow Z_X^k + \Delta \beta^k \Delta Z_X^k,$ $Z_S^{k+1} \leftarrow Z_S^k + \Delta \beta^k \Delta Z_S^k,$ wherein the steps of updating the barrier parameter, evaluating $(\Delta X^k, \Delta S^k, \Delta Y^k, \Delta y_1^k, \Delta y_2^k)$, calculating $(\Delta Z_X^k, \Delta Z_S^k)$, determining a step length $\Delta \beta^k$, and updating $X^{k+1}$, $S^{k+1}$, $Y^{k+1}$, $y_1^{k+1}$, $y_2^{k+1}$, $Z_X^{k+1}$ and $Z_S^{k+1}$ are repeated until either a dual gap or a maximum of $(r_X, r_S)$ is less than a pre-specified minimum.

9. The method of claim 1, wherein said cost function is, $$f(x, u) = \sum_{i=1}^N \left[ \frac{1}{2} x_i^T V_i^X x_i + \frac{1}{2} \sum_{Ki} u_i^{kT} V_i^U u_i^k + S_i^X x_i + S_i^U \sum_{Ki} u_i^k \right] + \sum_{i,j=1}^N R_{ij} \cdot \left[ \frac{1}{2} x_{ij}^T W_{ij}^X x_{ij} + \frac{1}{2} \sum_{Kij} u_{ij}^{kT} W_{ij}^U u_{ij}^k + T_{ij}^X x_{ij} + T_{ij}^U \sum_{Kik} u_{ij}^k \right]$$

wherein bus control vector $u_i$ includes voltage magnitudes $V_i$, phase angles $\theta_i$, and shunt switch positions $Q_i$, bus dependent variables vector $x_i$ includes net active $x_i^P$ and reactive $x_i^Q$ power injection, branch control vector $u_{ij}$ includes transformer tap selections $t_{ij}$ and phase shifts $\phi_{ij}$, and dependent branch variable vector $x_{ij}$ includes net active $x_{ij}^P$ and reactive $x_{ij}^Q$ power injections, and connection matrix $$R_{ij} = \begin{cases} 1, & \exists\, (i,j), \\ 0, & o/w, \end{cases}$$

wherein $$x_i = \sum_{j=1}^{N} R_{ij} \cdot x_{ij},$$

wherein $V^X$ is a Hessian of the objective function with respect to $x_i$, $V^U$ is a Hessian of the objective function with respect to $u_i$, $S^X$ is a gradient of the objective function with respect to $x_i$, $S^U$ is a gradient of the objective function with respect to $u_i$, $W^X$ is a Hessian of the objective function with respect to $x_{ij}$, $W^U$ is a Hessian of the objective function with respect to $u_{ij}$, $T^X$ is a gradient of the objective function with respect to $x_{ij}$, and $T^U$ is a gradient of the objective function with respect to $u_{ij}$, subject to constraints $$x_i^{LB} \le x_i \le x_i^{UB},$$

$$u_i^{LB} \le \sum_{Ki} u_i^k \le u_i^{UB},$$

$$x_{ij}^{LB} \le x_{ij} \le x_{ij}^{UB},$$

$$u_{ij}^{LB} \le \sum_{Kij} u_{ij}^k \le u_{ij}^{UB},$$

wherein a control grid is discretized by binary variables $z \in \{0,1\}$ as $$z_i^k u_{ik}^{LB} \le u_i^k \le z_i^k u_{ik}^{UB},$$

$$z_{ij}^k u_{ijk}^{LB} \le u_{ij}^k \le z_{ij}^k u_{ijk}^{UB},$$

wherein the binary variables are subject to constraints $$z_i^{LB} \le \sum_{Ki} z_i^k \le z_i^{UB}$$

$$z_i^{LB} \le \sum_{Ki} z_i^k \le z_i^{UB}$$

and satisfying a voltage law $x_{ij} = R_{ij} \cdot (\Sigma_{Ki} A_{ij}^{\,k} u_i^k + \Sigma_{Kj} B_{ij}^{\,k} u_j^k + \Sigma_{Kij} C_{ij}^{\,k} u_{ij}^k + \Sigma_{Kji} D_{ij}^{\,k} u_{ji}^k)$, where the matrices $A_{ij}^{\,0}, B_{ij}^{\,0}, C_{ij}^{\,0}, D_{ij}^{\,0}, E_{ij}^{\,0}$ can be explicitly pre-calculated for every link $(i, j)$ for a given anchor point $(u_i^o, u_j^o, u_{ij}^o)$.

10. The method of claim 1, wherein said cost function is $f(\tilde{x}, u, y, v) = \frac{1}{2}[\tilde{x}^T V^X \tilde{x} + u^T V^U u + y^T W^Y y + v^T W^V v] + S^X \tilde{x} + S^U u + T^Y y + T^V v$, wherein bus control vector u includes voltage magnitudes $V_i$, phase angles $\theta_i$, and shunt switch positions $Q_i$, bus dependent variables vector x includes net active $x_i^P$ and reactive $x_i^Q$ power injection, branch control vector v includes transformer tap selections $t_{ij}$ and phase shifts $\phi_{ij}$, and dependent branch variable vector y includes net active $x_{ij}^P$ and reactive $x_{ij}^Q$ power injections, wherein bus dependent vector is defined as $$x = \tilde{A}\tilde{x} \Leftrightarrow x_i = \sum_{k=1}^{G_i} x_{i,k}^g - \sum_{k=1}^{L_i} x_{i,k}^l + \sum_{k=1}^{SH_i} x_{i,k}^{sh},$$

wherein where $G_i$, $L_i$ and $SH_i$ are the number of generators, loads and shunts placed on bus i and $x_{i,k}^g$, $x_{i,k}^l$ and $x_{i,k}^{sh}$ are the $k^{th}$ active and reactive generation, load and shunt variables at bus i, respectively, and $$\tilde{A} \in \{-1, 0, 1\}^{N \times 2(G+L+SH)},$$

wherein $V^X$ is a Hessian of the objective function with respect to x, $V^U$ is a Hessian of the objective function with respect to u, $S^X$ is a gradient of the objective function with respect to x, $S^U$ is a gradient of the objective function with respect to u, $W^Y$ is a Hessian of the objective function with respect to y, $W^V$ is a Hessian of the objective function with respect to v, $T^Y$ is a gradient of the objective function with respect to y, and $T^V$ is a gradient of the objective function with respect to v, said cost function having connection matrix $$R_{ij} = \begin{cases} 1, & \exists\, (i,j), \\ 0, & o/w, \end{cases}$$

wherein $$a_i \tilde{x} = \sum_{j=1}^{N} R_{ij} y_{ij}$$

wherein $a_i$ is $i^{th}$ row of matrix $\tilde{A}$, subject to the constraints $$\tilde{x}^{LB} \le \tilde{x} \le \tilde{x}^{UB}, y^{LB} \le y \le y^{UB},$$

$$u^{LB} \le u \le u^{UB}, v^{LB} \le v \le v^{UB},$$

and satisfying a voltage law $y_{ij} = R_{ij} \cdot (A_{ij}^{\,o} \cdot u_i + \beta_{ij}^{\,o} \cdot u_j + C_{ij}^{\,o} \cdot v_{ij} + D_{ij}^{\,o} \cdot v_{ji} + E_{ij}^{\,o})$, wherein the matrices $A_{ij}^{\,o}, B_{ij}^{\,o}, C_{ij}^{\,o}, D_{ij}^{\,o}, E_{ij}^{\,o}$ can be explicitly pre-calculated for every link $(i, j)$ for a given anchor point $(u_i^o, u_j^o, u_{ij}^o)$.

11. A method for approximating an optimal power flow of a smart electric power grid, comprising the steps of:

providing a cost function that models a smart electric power grid having N buses $i \in [1,N]$ connected by branches $i,j \in [1,N] \times [1,N]$ with connection matrix $$R_{ij} = \begin{cases} 1, & \exists\, \text{branch } i, j, \\ 0, & \text{otherwise}, \end{cases}$$

in terms of bus control vector $u_i$ that include voltage magnitudes $V_i$, phase angles $\theta_i$, and shunt switch positions $Q_i$, bus dependent variables vector $x_i$ that include net active $x_i^P$ and reactive $x_i^Q$ power injection, wherein superscripts P and Q respectively refer to the net active power injection and the reactive power injection, branch control vector $u_{ij}$ that includes transformer tap selections $t_{ij}$ and phase shifts $\phi_{ij}$, and dependent branch variable vector $x_{ij}$ that includes net active $x_{ij}^P$ and reactive $x_{ij}^Q$ power injections, constraining the bus and branch control vectors, and the bus and branch dependent variables vectors based on physical and operational requirements and actual measurements;

deriving a set of non-linear vector equations $$\tilde{L} = \begin{bmatrix} \nabla f(X) - \mu/X - Y - y_1^T \nabla o(x_{ij}, x_i) - y_2^T \nabla v(X) \\ -\mu/S - Y \\ -(X + S - X^{UB}) \\ -o(x_{ij}, x_i) \\ -v(X) \end{bmatrix} = 0$$

that minimize said cost function subject to the constraints, from an expression of an extremum of said cost function with respect to all arguments, wherein superscript T refers to a vector or matrix transpose, wherein $X=(\{x_i\}, \{x_{ij}\}, \{u_i\}, \{u_{ij}\})^T$, bus control vector $u_i$ includes voltage magnitudes $V_i$, phase angles $\theta_i$, and shunt switch positions $Q_{i,}$, bus dependent variables vector $x_i$ includes net active $x_i^P$ and reactive $x_i^Q$ power injection, branch control vector $u_{ij}$ includes transformer tap selections $t_{ij}$ and phase shifts $\phi_{ij}$, and dependent branch variable vector $x_{ij}$ includes net active $x_{ij}^P$ and reactive $x_{ij}^Q$ power injections, $S=(\{s_{xi}\}, \{s_{xij}\}, \{s_{ui}\}, \{s_{uij}\})^T$, where $s_{xi}, s_{ui}, s_{xij}, s_{uij}$ are slack variables, $$o(x_{ij}, x_i) = x_{i1} - \sum_{j=1}^{N} R_{ij} \cdot x_{ij1} - b_x,$$

$$v(X) = x_{ij1} - R_{ij} \cdot (A_{ij}^0 \cdot u_{i1} + B_{ij}^0 \cdot u_{j1} + C_{ij}^0 \cdot u_{ij1} + D_{ij}^0 \cdot u_{ji1}) - b_v$$

$b_x$ and $b_v$ are predetermined constants, $$R_{ij} = \begin{cases} 1, & \exists (i, j), \\ 0, & o/w, \end{cases}$$

is a connection matrix wherein $$x_i = \sum_{j=1}^{N} R_{ij} \cdot x_{ij},$$

$$x_{ij} = R_{ij} \cdot (A_{ij}^0 u_i + B_{ij}^0 u_j + C_{ij}^0 u_{ij} + D_{ij}^0 u_{ji} + E_{ij}^0)$$

is a voltage law wherein the matrices $A_{ij}^0, B_{ij}^0, C_{ij}^0, D_{ij}^0, E_{ij}^0$ can be explicitly pre-calculated for every link (i, j) for a given anchor point $(u_i^0, u_j^0, u_{ij}^0)$ Y, $y_1$, and $y_2$ are dual variables, and $\mu$ is a barrier parameter;

re-organizing the vector $\tilde{L}$ as $$\tilde{L} = \begin{bmatrix} \{L^i\} \\ \{L^{ij}\} \end{bmatrix},$$

wherein each $L^i$ represent the constraints of bus i, and each $L^{ij}$ represents the constraints of branch (i, j);

applying Newton's method to every bus $L^i$ and branch $L^{ij}$, to obtain $$H^i \cdot \begin{bmatrix} \Delta X^i \\ \Delta S^i \\ \Delta Y^i \\ \Delta y_1^i \\ \Delta y_2^i \end{bmatrix} = -L^i; H^{ij} \cdot \begin{bmatrix} \Delta X^{ij} \\ \Delta S^{ij} \\ \Delta Y^{ij} \\ \Delta y_1^{ij} \\ \Delta y_2^{ij} \end{bmatrix} = -L^{ij},$$

where $H^i$ and $H^{ij}$ are Jacobian matrices, $\Delta X^i=(\{\Delta x_i\}, \{\Delta u_i\})^T$, $\Delta X^{ij}=(\{\Delta x_{ij}\}, \{\Delta u_{ij}\})$, $\Delta S^i=(\{\Delta s_{xi}\}, \{\Delta s_{ui}\})^T$, $\Delta S^{ij}=(\{\Delta s_{xij}\}, \{\Delta s_{uij}\})$, and $[\Delta X, \Delta S, \Delta Y, \Delta y_1, \Delta y_2]$ are unknowns; and using cutting planes to solve these block-wise Newton's equations, wherein a solution of said two systems of block matrix equations yields conditions for a lowest cost per kilowatt hour delivered through said smart electric power grid, wherein the steps of re-organizing the vector $\tilde{L}$, applying Newton's method, and using cutting planes to solve these block-wise Newton's equations, are performed by a computer processor.

12. A non-transitory program storage device readable by a computer, tangibly embodying a program of instructions executed by the computer to perform the method steps for approximating an optimal power flow of a smart electric power grid, the method comprising the steps of:

providing a cost function that models a smart electric power grid having N buses i∈[1, N] connected by branches i,j∈[1,N]×[1,N] with connection matrix $$R_{ij} = \begin{cases} 1, & \exists \text{ branch } i, j, \\ 0, & \text{otherwise,} \end{cases}$$

in terms of bus control vector $u_i$ that include voltage magnitudes $V_i$, phase angles $\theta_i$, and shunt switch positions $Q_{1,}$, bus dependent variables vector $x_i$ that include net active $x_i^P$ and reactive $x_i^Q$ power injection, wherein superscripts P and Q respectively refer to the net active power injection and the reactive power injection, branch control vector $u_{ij}$ that includes transformer tap selections $t_{ij}$ and phase shifts $\phi_{ij}$, and dependent branch variable vector $x_{ij}$ that includes net active $x_{ij}^P$ and reactive $x_{ij}^Q$ power injections, constraining the bus and branch control vectors, and the bus and branch dependent variables vectors based on physical and operational requirements and actual measurements;

deriving a set of linear equations that minimize said cost function subject to the constraints, from an expression of an extremum of said cost function with respect to all arguments;

reducing a dimension of the linear equations by solving for a subset of the linear equations;

re-organizing the reduced dimension linear equations into primal and dual parts; and decomposing the re-organized reduced dimensional linear equations into two systems of block matrix equations, wherein a solution of said two systems of block matrix equations yields conditions for a lowest cost per kilowatthour delivered through said smart electric power grid.

13. The computer readable program storage device of claim 12, wherein said cost function is $$f(x, u) = \sum_{i=1}^{N} \left[ \frac{1}{2} x_i^T V_i^X x_i + \frac{1}{2} u_i^T V_i^U u_i + S_i^X x_i + S_i^U u_i \right] +$$

$$\sum_{i,j=1}^{N} R_{ij} \cdot \left[ \frac{1}{2} x_{ij}^T W_{ij}^X x_{ij} + \frac{1}{2} u_{ij}^T W_{ij}^U u_{ij} + T_{ij}^X x_{ij} + T_{ij}^U u_{ij} \right],$$

wherein bus control vector $u_i$ includes voltage magnitudes $V_i$, phase angles $\theta_i$, and shunt switch positions $Q_{i^*}$, bus dependent variables vector $x_i$ includes net active $x_i^P$ and reactive $x_i^Q$ power injection, branch control vector $u_{ij}$ includes transformer tap selections $t_{ij}$ and phase shifts $\phi_{ij}$, and dependent branch variable vector $x_{ij}$ includes net active $x_{ij}^P$ and reactive $x_{ij}^Q$ power injections, and connection matrix $$R_{ij} = \begin{cases} 1, & \exists (i,j), \\ 0, & o/w, \end{cases}$$

wherein $$x_i = \sum_{j=1}^{N} R_{ij} \cdot x_{ij},$$

wherein $V^X$ is a Hessian of the objective function with respect to $x_i$, $V^U$ is a Hessian of the objective function with respect to $u_i$, $S^X$ is a gradient of the objective function with respect to $x_i$, $S^U$ is a gradient of the objective function with respect to $u_i$, $W^X$ is a Hessian of the objective function with respect to $x_{ij}$, $W^U$ is a Hessian of the objective function with respect to $u_{ij}$, $T^X$ is a gradient of the objective function with respect to $x_{ij}$, and $T^U$ is a gradient of the objective function with respect to $u_{ij}$, subject to the constraints $$x_i^{LB} \le x_i \le x_i^{UB}, \; x_{ij}^{LB} \le x_{ij} \le x_{ij}^{UB},$$

$$u_i^{LB} \le u_i \le u_i^{UB}, \; u_{ij}^{LB} \le u_{ij} \le u_{ij}^{UB},$$

wherein superscripts LB and UB respectively refer to a lower bound and an upper bound, and satisfying a voltage law $x_{ij} = R_{ij} \cdot (A_{ij}^0 + B_{ij}^0 u_i + C_{ij}^0 u_{ij} + D_{ij}^0 u_{ji} + E_{ij}^0)$, wherein the matrices $A_{ij}^0, B_{ij}^0, C_{ij}^0, D_{ij}^0, E_{ij}^0$ can be explicitly pre-calculated for every link $(i,j)$ for a given anchor point $(u_i^0, u_j^0, u_{ij}^0)$.

14. The computer readable program storage device of claim 13, wherein said linear equations that minimize said cost function are:

$$\begin{bmatrix} H_{11} & 0 & -I & H_{41}^T & H_{51}^T & -I & 0 \\ 0 & 0 & -I & 0 & 0 & 0 & -I \\ -I & -I & 0 & 0 & 0 & 0 & 0 \\ H_{41} & 0 & 0 & 0 & 0 & 0 & 0 \\ H_{51} & 0 & 0 & 0 & 0 & 0 & 0 \\ \mathrm{diag}(Z_X) & 0 & 0 & 0 & 0 & \mathrm{diag}(X) & 0 \\ 0 & \mathrm{diag}(Z_S) & 0 & 0 & 0 & 0 & \mathrm{diag}(S) \end{bmatrix} \cdot \begin{bmatrix} \Delta X \\ \Delta S \\ \Delta Y \\ \Delta y_1 \\ \Delta y_2 \\ \Delta Z_x \\ \Delta Z_s \end{bmatrix} =$$

$$-\begin{bmatrix} \nabla f(X) - Z_x - Y - y_1^T \nabla o(x_{ij}, x_i) - y_2^T \nabla v(X) \\ -Y - Z_s \\ -(X + S - X^{UB}) \\ -o(x_{ij}, x_i) \\ -v(X) \\ Z_x \cdot X - \mu e \\ Z_s \cdot S - \mu e \end{bmatrix},$$

wherein $[\Delta X, \Delta S, \Delta Y, \Delta y_1, \Delta y_2, \Delta Z_x, \Delta Z_s]$ are unknowns, I represents an identity matrix, $$H_{11} = \mathrm{diag}(V^x, W^x, V^u, W^U),$$

$$H_{41} = [-I, R, 0, 0],$$

$$R = \begin{pmatrix} [R_{11}I \; \ldots \; R_{1N_1}I] & 0 & \ldots & 0 \\ 0 & [R_{21}I \; \ldots \; R_{2N_2}I] & \ldots & 0 \\ 0 & \vdots & \ddots & \vdots \\ 0 & \ldots & 0 & [R_{N_11}I \; \ldots \; R_{N_1N_1}I] \end{pmatrix},$$

a row of branch $(i, j)$ of $H_{51}$ is $$(H_{51})_{ij} = [0, -I, \ldots R_{ij}A_{ij}^0, \ldots R_{ij}B_{ij}^0, \ldots R_{ij}C_{ij}^0, \ldots R_{ij}D_{ij}^0, \ldots 0],$$

$$X = (\{x_{i1}\}, \{x_{ij1}\}, \{u_{i1}\}, \{u_{ij1}\})^T,$$

slack variables $S = (\{s_{xi}\}, \{s_{xij}\}, \{s_{ui}\}, \{s_{uij}\})^T,$ $$o(x_{ij}, x_i) = x_{i1} - \sum_{j=1}^{N} R_{ij} \cdot x_{ij1} - b_x,$$

$$v(X) = x_{ij1} - R_{ij} \cdot (A_{ij}^0 \cdot u_{i1} + B_{ij}^0 \cdot u_{j1} + C_{ij}^0 \cdot u_{ij1} + D_{ij}^0 \cdot u_{ji1}) - b_v,$$

$Y$, $y_1$, and $y_2$ are dual variables, and $Z_x = \mu/X$, $Z_s = \mu/S$ wherein $\mu$ is a barrier parameter.

15. The computer readable program storage device of claim 14, wherein reducing a dimension of the linear equations further comprises solving for $$\Delta Z_X = \mathrm{diag}(X)^{-1}(-r_{Z_X} - \mathrm{diag}(Z_X)\Delta X),$$

$$\Delta Z_S = \mathrm{diag}(S)^{-1}(-r_{Z_S} - \mathrm{diag}(Z_S)\Delta S),$$

wherein $r_{Z_X} = Z_X \cdot X - \mu e$, $r_{Z_S} = Z_S \cdot S - \mu e$.

16. The computer readable program storage device of claim 15, wherein the reduced dimension linear equations re-organized into primal and dual parts are $$\begin{bmatrix} H_{41} & 0 & | & 0 & 0 & 0 \\ H_{51} & 0 & | & 0 & 0 & 0 \\ -I & -I & | & 0 & 0 & 0 \\ - & - & | & - & - & - \\ H_{11} + \mathrm{diag}(X)^{-1}\mathrm{diag}(Z_x) & 0 & | & -I & H_{41}^T & H_{51}^T \\ 0 & \mathrm{diag}(S)^{-1}\mathrm{diag}(Z_S) & | & -I & 0 & 0 \end{bmatrix}$$

-continued $$\begin{bmatrix} \Delta X \\ \Delta S \\ - \\ \Delta Y \\ \Delta y_1 \\ \Delta y_2 \end{bmatrix} = \begin{bmatrix} -r_{y_1} \\ -r_{y_2} \\ -r_Y \\ - \\ -r_X - \mathrm{diag}(X)^{-1} r_{Z_X} \\ -r_S - \mathrm{diag}(S)^{-1} r_{Z_S} \end{bmatrix},$$

wherein $$\begin{bmatrix} r_X \\ r_S \\ r_Y \\ r_{y_1} \\ r_{y_2} \end{bmatrix} = \begin{bmatrix} \nabla f(X) - Z_X - Y - y_1^T \nabla o(x_{ij}, x_i) - y_2^T \nabla v(X) \\ -Y - Z_S \\ -(X + S - X^{UB}) \\ -o(x_{ij}, x_i) \\ -v(X) \end{bmatrix}.$$

17. The computer readable program storage device of claim 16, wherein the two systems of block matrix equations are $$\begin{bmatrix} H_{41} & 0 \\ H_{51} & 0 \\ -I & -I \end{bmatrix} \begin{bmatrix} \Delta X \\ \Delta S \end{bmatrix} = \begin{bmatrix} -r_{y_1} \\ -r_{y_2} \\ -r_Y \end{bmatrix},$$

and $\begin{bmatrix} \tilde{H}_{11} & 0 \\ 0 & \tilde{H}_{22} \end{bmatrix} \begin{bmatrix} \Delta X \\ \Delta S \end{bmatrix} + \begin{bmatrix} -I & H_{41}^T & H_{51}^T \\ -I & 0 & 0 \end{bmatrix} \begin{bmatrix} \Delta Y \\ \Delta y_1 \\ \Delta y_2 \end{bmatrix} = \begin{bmatrix} -\tilde{r}_X \\ -\tilde{r}_S \end{bmatrix},$ wherein $\tilde{H}_{11} = H_{11} + \mathrm{diag}(X)^{-1}\mathrm{diag}(Z_X),$ $\tilde{H}_{22} = \mathrm{diag}(S)^{-1}\mathrm{diag}(Z_S),$ $\tilde{r}_X = r_X + \mathrm{diag}(X)^{-1} r_{Z_X},$ $\tilde{r}_S = r_S + \mathrm{diag}(S)^{-1} r_{Z_S},$ $\Delta X = \begin{bmatrix} \{\Delta x_i\} \\ \{\Delta x_{ij}\} \\ \{\Delta u_i\} \\ \{\Delta u_{ij}\} \end{bmatrix},$ $\Delta y_1 = \{\Delta y_1^{x_i}\},$ $\Delta y_2 = \{\Delta y_2^{x_{ij}}\}.$

18. The computer readable program storage device of claim 17, wherein the first block matrix equation is expanded for each bus i and branch(i, j) as follows:

$\Delta x_i - \sum_j R_{ij} \Delta x_{ij} = r_{y_i}^{x_i}$ $\Delta x_{ij} - R_{ij}(A_{ij}\Delta u_i + B_{ij}\Delta u_j + C_{ij}\Delta u_{ij} + D_{ij}\Delta u_{ji}) = r_{y_2}^{x_{ij}}$ $\Delta X + \Delta S = r_Y,$ and the second block matrix equation is expanded for each bus i and branch(i, j) as follows:

$\tilde{V}_i^X \Delta x_i - \Delta Y^{x_i} - \Delta y_1^{x_i} = -\tilde{r}_{x_i}$ $\tilde{W}_{ij}^X \Delta x_{ij} - \Delta Y^{x_{ij}} + R_{ij}\Delta y_1^{x_i} - \Delta y_2^{x_{ij}} = -\tilde{r}_{x_{ij}}$ $\tilde{V}_i^U \Delta u_i - \Delta Y^{u_i} + \sum_j R_{ij} A_{ij}^T \Delta y_2^{x_{ij}} + \sum_j R_{ji} B_{ji}^T \Delta y_2^{x_{ij}} = -\tilde{r}_{u_i}$ $\tilde{W}_{ij}^U \Delta u_{ij} - \Delta Y^{u_{ij}} + R_{ij} C_{ij}^T \Delta y_2^{x_{ij}} + R_{ji} D_{ji}^T \Delta y_2^{x_{ji}} = -\tilde{r}_{u_{ij}}$ $\tilde{H}_{22} \Delta S - \Delta Y = -\tilde{r}_S,$ and wherein the method further comprises solving for the other variables in the block matrix equations in the following order:

$\{\Delta u_i\}, \{\Delta u_{ij}\} \rightarrow \{\Delta x_{ij}\} \rightarrow \{\Delta x_i\} \rightarrow \Delta S \rightarrow \Delta Y \rightarrow \Delta y_1 \rightarrow \Delta y_2.$

19. The computer readable program storage device of claim 17, the method further comprising:

initializing unknowns $[\Delta X^k, \Delta S^k, \Delta Y^k, \Delta y_1^k, \Delta y_2^k]$ wherein k is an iteration counter;

updating the barrier parameter as $\mu^{k+1} \leftarrow \epsilon \cdot \mu^k$, $\epsilon \in (0.1, \ldots, 0.9)$;

evaluating $(\Delta X^k, \Delta S^k, \Delta Y^k, \Delta y_1^k, \Delta y_2^k)$ using the two block matrix equations;

calculating $(\Delta Z_X^k, \Delta Z_S^k)$;

determining a step length $\Delta \beta^k$; from a line search; and updating $X^{k+1} \leftarrow X^k + \Delta \beta^k \Delta X^k,$ $S^{k+1} \leftarrow S^k + \Delta \beta^k \Delta S^k,$ $Y^{k+1} \leftarrow Y^k + \Delta \beta^k \Delta Y^k,$ $y_1^{k+1} \leftarrow y_1^k + \Delta \beta^k \Delta y_1^k,$ $y_2^{k+1} \leftarrow y_2^k + \Delta \beta^k \Delta y_2^k,$ $Z_X^{k+1} \leftarrow Z_X^k + \Delta \beta^k \Delta Z_X^k,$ $Z_X^{k+1} \leftarrow Z_S^k + \Delta \beta^k \Delta Z_S^k,$ wherein the steps of updating the barrier parameter, evaluating $(\Delta X^k, \Delta S^k, \Delta Y^k, \Delta y_1^k, \Delta y_2^k)$, calculating $(\Delta Z_X^k, \Delta Z_S^k)$, determining a step length $\Delta\beta^k$, and updating $X^{k+1}$, $S^{k+1}$, $Y^{k+1}$, $y_1^{k+1}$, $y_2^{k+1}$, $Z_X^{k+1}$ and $Z_S^{k+1}$ are repeated until either a dual gap or a maximum of $(r_X, r_S)$ is less than a pre-specified minimum.

20. The computer readable program storage device of claim 12, wherein said cost function is, $$f(x, u) = \sum_{i=1}^{N} \left[ \frac{1}{2} x_i^T V_i^X x_i + \frac{1}{2} \sum_{Ki} u_i^{kT} V_i^U u_i^k + S_i^X x_i + S_i^U \sum_{Ki} u_i^k \right] +$$

$$\sum_{i,j=1}^{N} R_{ij} \cdot \left[ \frac{1}{2} x_{ij}^T W_{ij}^X x_{ij} + \frac{1}{2} \sum_{Kij} u_{ij}^{kT} W_{ij}^U u_{ij}^k + T_{ij}^X x_{ij} + T_{ij}^U \sum_{Kik} u_{ij}^k \right]$$

wherein bus control vector $u_i$ includes voltage magnitudes $V_i$, phase angles $\theta_i$, and shunt switch positions $Q_i$, bus dependent variables vector $x_i$ includes net active $x_i^P$ and reactive $x_i^Q$ power injection, branch control vector $u_{ij}$ includes transformer tap selections $t_{ij}$ and phase shifts $\phi_{ij}$, and dependent branch variable vector $x_{ij}$ includes net active $x_{ij}^P$ and reactive $x_{ij}^Q$ power injections, and connection matrix $$R_{ij} = \begin{cases} 1, & \exists (i,j), \\ 0, & o/w, \end{cases}$$

wherein $$x_i = \sum_{j=1}^{N} R_{ij} \cdot x_{ij},$$

wherein $V^X$ is a Hessian of the objective function with respect to $x_i$, $V^U$ is a Hessian of the objective function with respect to $u_i$, $S^X$ is a gradient of the objective function with respect to $x_i$, $S^U$ is a gradient of the objective function with respect to $u_i$, $W^X$ is a Hessian of the objective function with respect to $x_{ij}$, $W^U$ is a Hessian of the objective function with respect to $u_{ij}$, $T^X$ is a gradient of the objective function with respect to $x_{ij}$, and $T^U$ is a gradient of the objective function with respect to $u_{ij}$, subject to constraints
$$x_i^{LB} \le x_i \le x_i^{UB}, \quad u_i^{LB} \le \sum_{Ki} u_i^k \le u_i^{UB},$$
$$x_{ij}^{LB} \le x_{ij} \le x_{ij}^{UB}, \quad u_{ij}^{LB} \le \sum_{Kij} u_{ij}^k \le u_{ij}^{UB},$$

wherein a control grid is discretized by binary variables $z \in \{0, 1\}$ as $$z_i^k u_{ik}^{LB} \le u_i^k \le z_i^k u_{ik}^{UB},$$
$$z_{ij}^k u_{ijk}^{LB} \le u_{ij}^k \le z_{ij}^k u_{ijk}^{UB},$$

wherein the binary variables are subject to constraints $$z_i^{LB} \le \sum_{Ki} z_i^k \le z_i^{UB}$$
$$z_i^{LB} \le \sum_{Ki} z_i^k \le z_i^{UB}$$

and satisfying a voltage law $x_{ij} = R_{ij} \cdot (\Sigma_{Ki} A_{ij}^k u_i^k + \Sigma_{Kj} B_{ij}^k u_j^k + \Sigma_{Kij} C_{ij}^k u_{ij}^k + \Sigma_{Kji} D_{ji}^k u_{ji}^k)$, where the matrices $A_{ij}^0, B_{ij}^0, C_{ij}^0, D_{ij}^0, E_{ij}^0$ can be explicitly pre-calculated for every link $(i, j)$ for a given anchor point $(u_i^0, u_j^0, u_{ij}^0)$.

21. The computer readable program storage device of claim 12, wherein said cost function is $$f(\tilde{x}, u, y, v) = \frac{1}{2}[\tilde{x}^T V^X \tilde{x} + u^T V^U u + y^T W^Y y + v^T W^V v] + S^X \tilde{x} + S^U u + T^Y y + T^V v,$$

wherein bus control vector u includes voltage magnitudes $V_i$, phase angles $\theta_i$, and shunt switch positions $Q_{1_i}$, bus dependent variables vector x includes net active $x_i^P$ and reactive $x_i^Q$ power injection, branch control vector v includes transformer tap selections $t_{ij}$ and phase shifts $\phi_{ij}$, and dependent branch variable vector y includes net active $x_{ij}^P$ and reactive $x_{ij}^Q$ power injections, wherein bus dependent vector is defined as $$x = \tilde{A}\tilde{x} \Leftrightarrow x_i = \sum_{k=1}^{G_i} x_{i,k}^g - \sum_{k=1}^{L_i} x_{i,k}^l + \sum_{k=1}^{SH_i} x_{i,k}^{sh},$$

wherein where $G_i$, $L_i$ and $SH_i$ are the number of generators, loads and shunts placed on bus i and $x_{i,k}^g, x_{i,k}^l$ and $x_{i,k}^{sh}$ are the $k^{th}$ active and reactive generation, load and shunt variables at bus i, respectively, and $$\tilde{A} \in \{-1, 0, 1\}^{N \times 2(G+L+SH)},$$

wherein $V^X$ is a Hessian of the objective function with respect to x, $V^U$ is a Hessian of the objective function with respect to u, $S^X$ is a gradient of the objective function with respect to x, $S^U$ is a gradient of the objective function with respect to u, $W^Y$ is a Hessian of the objective function with respect to y, $W^V$ is a Hessian of the objective function with respect to v, $T^Y$ is a gradient of the objective function with respect to y, and $T^V$ is a gradient of the objective function with respect to v, said cost function having connection matrix $$R_{ij} = \begin{cases} 1, & \exists (i,j), \\ 0, & o/w, \end{cases}$$

wherein $$a_i \tilde{x} = \sum_{j=1}^{N} R_{ij} y_{ij}$$

wherein $a_i$ is $i^{th}$ row of matrix $\tilde{A}$, subject to the constraints $$\tilde{x}^{LB} \le \tilde{x} \le \tilde{x}^{UB}, \quad y^{LB} \le y \le y^{UB},$$
$$u^{LB} \le u \le u^{UB}, \quad v^{LB} \le v \le v^{UB},$$

and satisfying a voltage law $y_{ij} = R_{ij} \cdot (A_{ij}^0 \cdot u_i + B_{ij}^0 \cdot u_j + C_{ij}^0 \cdot v_{ij} + D_{ij}^0 \cdot v_{ji} + E_{ij}^0)$, wherein the matrices $A_{ij}^0, B_{ij}^0, C_{ij}^0, D_{ij}^0, E_{ij}^0$ can be explicitly pre-calculated for every link $(i, j)$ for a given anchor point $(u_i^0, u_j^0, u_{ij}^0)$.

\* \* \* \* \*